(12) United States Patent
Taranta, II et al.

(10) Patent No.: US 10,133,949 B2
(45) Date of Patent: Nov. 20, 2018

(54) SYNTHETIC DATA GENERATION OF TIME SERIES DATA

(71) Applicant: University of Central Florida Research Foundation, Inc., Orlando, FL (US)

(72) Inventors: Eugene M. Taranta, II, Casselberry, FL (US); Mehran Maghoumi, Oviedo, FL (US); Corey Pittman, Palm Bay, FL (US); Joseph J. LaViola, Jr., Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/651,219

(22) Filed: Jul. 17, 2017

(65) Prior Publication Data
US 2018/0018533 A1 Jan. 18, 2018

Related U.S. Application Data

(60) Provisional application No. 62/526,709, filed on Jun. 29, 2017, provisional application No. 62/362,922, filed on Jul. 15, 2016.

(51) Int. Cl.
*G06K 9/00* (2006.01)
*G06K 9/22* (2006.01)
(Continued)

(52) U.S. Cl.
CPC ......... *G06K 9/222* (2013.01); *G06F 3/04883* (2013.01); *G06F 17/16* (2013.01); *G06F 17/18* (2013.01)

(58) Field of Classification Search
CPC ............... G06K 9/222; G06K 9/00154; G06K 9/00335; G06K 9/00402; G06K 9/00409;
(Continued)

(56) References Cited

U.S. PATENT DOCUMENTS

| | | | | |
|---|---|---|---|---|
| 5,940,081 A | * | 8/1999 | Guo | ...................... G06T 11/203 345/442 |
| 7,227,993 B2 | * | 6/2007 | Xu | ...................... G06F 3/04883 382/179 |

(Continued)

OTHER PUBLICATIONS

Anthony et al. A Lightweight Multistroke Recognizer for User Interface Prototypes. In Proceedings of Graphics Interface 2010 (GI '10). Canadian Information Processing Society, Toronto, Ont., Canada, Canada, 245-252.

(Continued)

*Primary Examiner* — Jose Couso
(74) *Attorney, Agent, or Firm* — Molly L. Sauter; Nilay J. Choski; Smith & Hopen, P.A.

(57) ABSTRACT

A method of generating synthetic data from time series data, such as from handwritten characters, words, sentences, mathematics, and sketches that are drawn with a stylus on an interactive display or with a finger on a touch device. This computationally efficient method is able to generate realistic variations of a given sample. In a handwriting or sketch recognition context, synthetic data is generated from real data in order to train recognizers and thus improve recognition accuracy when only a limited number of samples are available. Similarly, synthetic data can also be used to test and validate such recognizers. Also discussed is a dynamic time warping based approach for both segmented and continuous data that is designed to be a robust, go-to method for gesture recognition across a variety of modalities using only limited training samples.

33 Claims, 19 Drawing Sheets

(51) Int. Cl.
 *G06F 3/0488* (2013.01)
 *G06F 17/16* (2006.01)
 *G06F 17/18* (2006.01)

(58) Field of Classification Search
 CPC ........... G06K 9/00416; G06K 9/00496; G06K
 9/00852; G06K 9/224; G06K 9/6207;
 G06K 11/02; G06K 11/04; G06K 11/06;
 G06K 2209/01; G06K 2209/15; G06F
 3/04883; G06F 3/011; G06F 3/014; G06F
 3/016; G06F 3/017; G06F 3/018; G06F
 3/0488; G06F 17/242; G06F 2203/04808;
 G06T 3/40; G06T 3/4007; G06T 11/203
 See application file for complete search history.

(56) References Cited

U.S. PATENT DOCUMENTS

| | | | | |
|---|---|---|---|---|
| 9,280,700 | B2* | 3/2016 | Kim | G06K 9/00167 |
| 9,563,926 | B2* | 2/2017 | Avni | G06T 1/0021 |
| 9,805,241 | B2* | 10/2017 | Li | G06K 9/00 |
| 2004/0136608 | A1 | 7/2004 | Rosenfeld | |
| 2008/0168339 | A1 | 7/2008 | Hudson et al. | |
| 2009/0006292 | A1* | 1/2009 | Block | G06F 3/04883 706/20 |
| 2009/0027398 | A1* | 1/2009 | Frisken | G06K 9/00409 345/442 |
| 2012/0131513 | A1* | 5/2012 | Ansell | G06F 3/04883 715/863 |
| 2013/0336091 | A1 | 12/2013 | Song et al. | |
| 2016/0210453 | A1* | 7/2016 | Seo | G06F 21/32 |
| 2017/0161607 | A1* | 6/2017 | English | G06F 3/017 |
| 2017/0344859 | A1* | 11/2017 | Mo | G06K 9/66 |
| 2017/0371417 | A1* | 12/2017 | Iyer | G06F 3/017 |

OTHER PUBLICATIONS

Anthony et al. $N-protractor: A Fast and Accurate Multistroke Recognizer. In Proceedings of Graphics Interface 2012 (GI '12). Canadian Information Processing Society, Toronto, Ont., Canada, Canada, 117-120.
Awal et al. Towards Handwritten Mathematical Expression Recognition. In Document Analysis and Recognition, 2009. ICDAR '09. 10th International Conference on. 1046-1050.
Blagojevic et al. The Power of Automatic Feature Selection: Rubine on Steroids. In Proceedings of the Seventh Sketch-Based Interfaces and Modeling Symposium (SBIM 2010). Eurographics Association, Aire-la-Ville, Switzerland, Switzerland, 79-86.
Cano et al. Structural, Syntactic, and Statistical Pattern Recognition: Joint IAPR International Workshops SSPR 2002 and SPR 2002 Windsor, Ontario, Canada, Aug. 6-9, 2002 Proceedings. Springer Berlin Heidelberg, Berlin, Heidelberg, Chapter Training Set Expansion in Handwritten Character Recognition, 548-556.
Caramiaux et al. Adaptive Gesture Recognition with Variation Estimation for Interactive Systems. ACM Trans. Interact. Intell. Syst. 4, 4, Article 18 (Dec. 2014), 34 pages.
Davila et al. Using off-line features and synthetic data for on-line handwritten math symbol recognition. In Frontiers in Handwriting Recognition (ICFHR), 2014 14th International Conference on. IEEE, 323-328.
Dinges et al. Image Processing and Communications Challenges 3. Springer Berlin Heidelberg, Berlin, Heidelberg, Chapter Synthizing Handwritten Arabic Text Using Active Shape Models, 2011, 401-408.
Duda et al. Pattern Classification (2nd Edition). Wiley-Interscience (2001).
Elanwar, R. I. The state of the art in handwriting synthesis. In 2nd International Conference on New Paradigms in Electronics & information Technology (peit'013), Luxor, Egypt (2013).

Farooq et al. Phrase-based Correction Model for Improving Handwriting Recognition Accuracies. Pattern Recogn. 42, 12 (Dec. 2009), 3271-3277.
Fischer et al. Neuromuscular Representation and Synthetic Generation of Handwritten Whiteboard Notes. In Frontiers in Handwriting Recognition (ICFHR), 2014 14th International Conference on. 222-227.
Fischer et al. Generation of Learning Samples for Historical Handwriting Recognition Using Image Degradation. In Proceedings of the 2Nd International Workshop on Historical Document Imaging and Processing (HIP 2013). ACM, Jew York, NY, USA, 73-79.
Galbally et al. Synthetic generation of handwritten signatures based on spectral analysis. In SPIE Defense, Security, and Sensing. International Society for Optics and Photonics (2009), 730629-730629.
Gatos et al. A Segmentation-free Approach for Keyword Search in Historical Typewritten Documents. In Proceedings of the Eighth International Conference on Document Analysis and Recognition (ICDAR 2005). IEEE Computer Society, Washington, DC, USA, 54-58.
Ha et al. Off-line, handwritten numeral recognition by perturbation method. IEEE Transactions on Pattern Analysis and Machine Intelligence 19, 5 (May 1997), 535-539.
Herold et al. The 1-cent: Recognizer: A Fast, Accurate, and Easy-to-implement Handwritten Gesture Recognition Technique. In Proceedings of the International Symposium on Sketch-Based Interfaces and Modeling (SBIM 2012). Eurographics Association, Aire-la-Ville, Switzerland, Switzerland, 39-46.
Taranta II et al. Streamlined and accurate gesture recognition with Penny Pincher. Computers & Graphics 55 (2016), 130-142.
Lee et al. A new synthesizing method for handwriting Korean scripts. International Journal of Pattern Recognition and Artificial Intelligence 12, 01 (1998), 45-61.
Leiva et al. Gestures À Go Go: Authoring Synthetic Human-Like Stroke Gestures Using the Kinematic Theory of Rapid Movements. ACM Trans. Intell. Syst. Technol. 7, 2, Article 15 (Nov. 2015), 29 pages.
Li et al. Protractor: A Fast and Accurate Gesture Recognizer. In Proceedings of the SIGCHI Conference on Human Factors in Computing Systems (CHI 2010). ACM, New York, NY, USA, 2169-2172.
Lü et al. Gesture Script: Recognizing Gestures and Their Structure Using Rendering Scripts and Interactively Trained Parts. In Proceedings of the SIGCHI Conference on Human Factors in Computing Systems (CHI 2014). ACM, New York, NY, USA, 1685-1694.
MacLean et al. Tools for the Efficient Generation of Hand-drawn Corpora Based on Context-free Grammars. In Proceedings of the 6th Eurographics Symposium on Sketch-Based Interfaces and Modeling (SBIM 2009). ACM, New York, NY, USA, 125-132.
Martin-Albo et al. Improving sigma-lognormal parameter extraction. In Document Analysis and Recognition (ICDAR), 2015 13th International Conference, 286-290.
Navaratnam et al. The Joint Manifold Model for Semi-supervised Multi-valued Regression. In Computer Vision, 2007. ICCV 2007. IEEE 11th International Conference, 1-8.
Perlin, K. An Image Synthesizer. In Proceedings of the 12th Annual Conference on Computer Graphics and Interactive Techniques (SIGGRAPH 1985). ACM, New York, NY, USA, 287-296.
Pittman et al. A $-Family Friendly Approach to Prototype Selection. In Proceedings of the 21st International Conference on Intelligent User Interfaces (IUI 2016). ACM, New York, NY, USA, 370-374.
Plamondon et al. A multi-level representation paradigm for handwriting stroke generation. Human movement science 25, 4 (2006), 586-607.
Rodriguez-Serrano et al. Synthesizing queries for handwritten word image retrieval. Pattern Recognition 45, 9 (2012), 3270-3276. Best Papers of Iberian Conference on Pattern Recognition and Image Analysis (IbPRIA'2011).
Rowley et al. The effect of large training set sizes on online Japanese Kanji and English cursive recognizers. In Frontiers in Handwriting Recognition, 2002. Proceedings. Eighth International Workshop on. 36-40.

(56) References Cited

OTHER PUBLICATIONS

Rubine, D. Specifying Gestures by Example. SIGGRAPH Computer Graphics 25, 4 (Jul. 1991), 329-337.
Shotton et al. Real-time Human Pose Recognition in Parts from Single Depth Images. In Proceedings of the 2011 IEEE Conference on Computer Vision and Pattern Recognition (CVPR '11). IEEE Computer Society, Washington, DC, USA, 1297-1304.
Thomas et al. Synthetic Handwritten CAPTCHAs. Pattern Recogn. 42, 12 (Dec. 2009), 3365-3373.
Varga et al. Generation of synthetic training data for an HMM-based handwriting recognition system. In Document Analysis and Recognition, 2003. Proceedings. Seventh International Conference on. 618-622 vol. 1.
Varga et al. Offline handwriting recognition using synthetic training data produced by means of a geometrical distortion model. International Journal of Pattern Recognition and Artificial Intelligence 18,07 (2004), 1285-1302.
Varga et al. Template-based synthetic handwriting generation for the training of recognition systems. In Proceedings of the 12th Conference of the International Graphonomics Society. 2005, 206-211.
Vatavu et al. Gestures As Point Clouds: A $P Recognizer for User Interface Prototypes. In Proceedings of the 14th ACM International Conference on Multimodal Interaction (ICMI 2012). ACM, New York, NY, USA, 273-280.
Vatavu et al. Relative Accuracy Measures for Stroke Gestures. In Proceedings of the 15th ACM on International Conference on Multimodal Interaction (ICMI 2013). ACM, New York, NY, USA, 279-286.
Vatavu et al. Estimating the Perceived Difficulty of Pen Gestures. In Proceedings of the 13th IFIP TC 13 International Conference on Human-computer Interaction—vol. Part II (INTERACT 2011). Springer-Verlag, Berlin, Heidelberg, 89-106.
Valek et al. Document Analysis Systems V: 5th International Workshop, DAS 2002 Princeton, NJ, USA, Aug. 19-21, 2002 Proceedings. Springer Berlin Heidelberg, Berlin, Heidelberg, Chapter The Impact of Large Training Sets on the Recognition Rate of Off-line Japanese Kanji Character Classifiers, 106-110.
Wobbrock et al. Gestures Without Libraries, Toolkits or Training: A $1 Recognizer for User Interface Prototypes. In Proceedings of the 20th Annual ACM Symposium on User Interface Software and Technology (UIST 2007). ACM, New York, NY, USA, 159-168.
Bagnall et al. The Great Time Series Classification Bake Off: An Experimental Evaluation of Recently Proposed Algorithms. Extended Version. arXiv preprint arXiv:1602.01711 (2016).
Batista et al. A Complexity-Invariant Distance Measure for Time Series. 2011, Chapter 60, 699-710.
Bodiroza et al. Position-invariant, Real-time Gesture Recognition Based on Dynamic Time Warping. In Proceedings of the 8th ACM/IEEE International Conference on Human-robot Interaction (HRI 2013). IEEE Press, Piscataway, NJ, USA, 87-88.
Celebi et al. Gesture Recognition using Skeleton Data with Weighted Dynamic Time Warping.. In VISAPP (1). 2013, 620-625.
Cheema et al. 3D Gesture classification with linear acceleration and angular velocity sensing devices for video games. Entertainment Computing 4, 1 (2013), 11-24.
Du et al. Hand gesture recognition using Kinect. Techical Report, Boston University (2011).
Ellis et al. Exploring the Trade-off Between Accuracy and Observational Latency in Action Recognition. International Journal of Computer Vision 101, 3 (Feb. 2013), 420-436.
Giusti et al. An Empirical Comparison of Dissimilarity Measures for Time Series Classification. In Proceedings of the 2013 Brazilian Conference on Intelligent Systems (BRACIS '13). IEEE Computer Society, Washington, DC, USA, 82-88.
Gupta et al. Soundwave: using the doppler effect to sense gestures. In Proceedings of the SIGCHI Conference on Human Factors in Computing Systems. ACM, 2012, 1911-1914.
Ibraheem et al. Survey on Various Gesture Recognition Technologies and Techniques. International Journal of Computer Applications 50, 7 (2012).

Keogh et al. Exact indexing of dynamic time warping. Knowledge and information systems 7, 3 (2005), 358-386.
Kratz et al. The $3 recognizer: simple 3D gesture recognition on mobile devices. In Proceedings of the 15th international conference on Intelligent user interfaces. ACM, 2010, 419-420.
Kratz et al. Protractor3D: a closed-form solution to rotation-invariant 3D gestures. In Proceedings of the 16th international conference on Intelligent User Interfaces. ACM, 2011, 371-374.
Laviola, J. 3d gestural interaction: The state of the field. International Scholarly Research Notices 2013.
Liu et al: uWave: Accelerometer-based personalized gesture recognition and its applications. Pervasive and Mobile Computing 5, 6 (2009), 657-675. PerCom 2009.
Liu et al. Rejection of non-meaningful activities for HMM-based activity recognition system. Image and Vision Computing 28, 6 (2010), 865-871.
Macrae et al. Accurate real-time windowed time warping. In in ISMIR, 2010. 423-428.
Mitra et al. Gesture Recognition: A Survey. IEEE Transactions on Systems, Man, and Cybernetics, Part C (Applications and Reviews) 37, 3 (May 2007), 311-324.
Pittman et al. Multiwave: Doppler Effect Based Gesture Recognition in Multiple Dimensions. In Proceedings of the 2016 CHI Conference Extended Abstracts on Human Factors in Computing Systems. ACM, 1729-1736.
Rakthanmanon et al. Searching and mining trillions of time series subsequences under dynamic time warping. In Proceedings of the 18th ACM SIGKDD international conference on Knowledge discovery and data mining. ACM, 2012, 262-270.
Ratanamahatana et al. Everything you know about dynamic time warping is wrong. In Third Workshop on Mining Temporal and Sequential Data. 2004.
Rautaray et al. Vision based hand gesture recognition for human computer interaction: a survey. Artificial Intelligence Review 43, 1 (2015), 1-54.
Ruan et al. AudioGest: enabling fine-grained hand gesture detection by decoding echo signal. In Proceedings of the 2016 ACM International Joint Conference on Pervasive and Ubiquitous Computing. ACM, 474-485.
Sarkar et al. Hand Gesture Recognition Systems: A Survey. International Journal of Computer Applications 71, 15 (2013).
Suarez et al. Hand gesture recognition with depth images: A review. In 2012 IEEE RO-MAN: The 21st IEEE International Symposium on Robot and Human Interactive Communication. 411-417.
Taranta, II, et al. A Rapid Prototyping Approach to Synthetic Data Generation for Improved 2D Gesture Recognition. In Proceedings of the 29th Annual Symposium on User Interface Software and Technology (UIST 2016). ACM, New York, NY, USA, 873-885.
Vatavu et al. The Effect of Sampling Rate on the Performance of Template-based Gesture Recognizers. In Proceedings of the 13th International Conference on Multimodal Interfaces (ICMI 2011). ACM, New York, NY, USA, 271-278.
Vikram et al. Writing and Sketching in the Air, Recognizing and Controlling on the Fly. In CHI '13 Extended Abstracts on Human Factors in Computing Systems (CHI EA 2013). ACM, New York, NY, USA, 1179-1184.
Wobbrock et al. The Aligned Rank Transform for Nonparametric Factorial Analyses Using Only Anova Procedures. In Proceedings of the SIGCHI Conference on Human Factors in Computing Systems (CHI 2011). ACM, New York, NY, USA, 143-146.
Wu et al. Dynamic time warping for gesture-based user identification and authentication with Kinect. In 2013 IEEE International Conference on Acoustics, Speech and Signal Processing. 2371-2375.
Zang et al. An inner-product lower-bound estimate for dynamic time warping. In 2011 IEEE International Conference on Acoustics, Speech and Signal Processing (ICASSP). IEEE, 5660-5663.
International Search Report and Written Opinion dated Sep. 28, 2017 for corresponding PCT International Application No. PCT/US17/42364.

\* cited by examiner (a) Original Sample  (b) Stochastically Resampled  (c) Post Normalization  (d) Synthetic Samples Distribution

SYNTHETIC DATA GENERATION OF TIME SERIES DATA

CROSS-REFERENCE TO RELATED APPLICATIONS

This nonprovisional application claims priority to U.S. Provisional Application No. 62/526,709, entitled "Synthetic Data Generation of Time Series Data", filed Jun. 29, 2017 by the same inventors, and to U.S. Provisional Application No. 62/362,922, entitled "Synthetic Data Generation of Time Series Data", filed Jul. 15, 2016 by the same inventors, both of which are incorporated herein by reference in their entireties.

BACKGROUND OF THE INVENTION

1. Field of the Invention

This invention relates, generally, to synthetic data generation. More specifically, it relates to generating realistic variations of a given sample such as handwritten characters, words, sentences, mathematics, and sketches that are scanned from a hardcopy, drawn with a stylus on an interactive display, or with a finger on a touch device. The invention may be extended to three dimensional samples.

2. Brief Description of the Prior Art

Training gesture recognizers with synthetic data generated from real gestures is a well-known and powerful technique that can significantly improve recognition accuracy. Although gesture recognition has been an active area of research for some time, it has become especially popular in the last decade with the introduction of several low-cost interactive devices, such as the WII REMOTE, KINECT, and LEAP MOTION. To support gesture recognition on these devices, a flurry of techniques has been proposed and evaluated, many of which rely on domain specific knowledge to achieve competitive accuracy (above 90%). Unsurprisingly, support vector machines, hidden Markov models, conditional random fields, decision trees and random forests, as well as variants of these machine learning approaches are ubiquitous [Joseph J LaViola. 2013. 3d gestural interaction: The state of the field. International Scholarly Research Notices 2013 (2013)]. However, these popular approaches are also inappropriate for rapid prototyping or gesture customization given that either copious training data or advanced knowledge of machine learning are typically required.

An example is [Siddharth S. Rautaray and Anupam Agrawal. 2015. Vision based hand gesture recognition for human computer interaction: a survey. Artificial Intelligence Review 43, 1 (2015), 1-54]. Further, Mitra and Acharya [S. Mitra and T. Acharya. 2007. Gesture Recognition: A Survey. IEEE Transactions on Systems, Man, and Cybernetics, Part C (Applications and Reviews) 37, 3 (May 2007), 311-324] discuss different gesture recognition methods such as hidden Markov Models (HMM), particle filtering and condensation, finite-state machines (FSM), and neural networks. As hand-based gesture recognition is a popular topic, Suarez and Murphy [Suarez and R. R. Murphy. 2012. Hand gesture recognition with depth images: A review. In 2012 IEEE RO-MAN: The 21st IEEE International Symposium on Robot and Human Interactive Communication. 411-417] look through recognition methods using depth images. These methods include common and customized approaches like Du's [Heng Du and TszHang To. 2011. Hand gesture recognition using KINECT. Technical Report, Boston University (2011)] classifier that counts the number of convex points in a hand silhouette for classification over a small set of static poses. Ibraheem and Khan [Noor A. Ibraheem and Rafiqul Z. Khan. 2012. Survey on Various Gesture Recognition Technologies and Techniques. International Journal of Computer Applications 50, 7 (2012)] also discuss HMMs, neural networks, and histogram based feature and fuzzy clustering algorithm methods. Sarkar et al. [Arpita R. Sarkar, G. Sanyal, and S. Majumder. 2013. Hand Gesture Recognition Systems: A Survey. International Journal of Computer Applications 71, 15 (2013)] similarly report on both 2D and 3D methods for hand gesture recognition. It is worth noting that computer vision techniques such as those just mentioned are common in the gesture (and action) recognition literature; however, it is assumed herein that gestures are a time series of trajectories through a multidimensional space.

A common theme of these works is that a large amount of training data is needed to train the recognizers. Another issue is that many approaches also require domain-specific knowledge to extract features useful for discriminating gesture classes, which in itself can be a very challenging problem to solve. Two clear advantages of dynamic time warping (DTW)-based recognizers are that competitive accuracy is still possible with limited data and complex feature extraction is unnecessary.

Rapid Prototyping

For the rapid prototyping community, gesture recognition must be easily accessible (i.e., self-contained, easy to debug, and can be implemented without too much effort) for development on new platforms, where best approaches have not been identified, or where libraries and toolkits may not yet be available and consumers are unfamiliar with machine learning. The $-family of recognizers [Lisa Anthony and Jacob O. Wobbrock. 2010. A Lightweight Multistroke Recognizer for User Interface Prototypes. In Proceedings of Graphics Interface 2010 (GI '10). Canadian Information Processing Society, Toronto, Ont., Canada, Canada, 245-252; Lisa Anthony and Jacob O. Wobbrock. 2012. $N-protractor: A Fast and Accurate Multistroke Recognizer. In Proceedings of Graphics Interface 2012 (GI '12). Canadian Information Processing Society, Toronto, Ont., Canada, Canada, 117-120; Yang Li. 2010. Protractor: A Fast and Accurate Gesture Recognizer. In Proceedings of the SIGCHI Conference on Human Factors in Computing Systems (CHI '10). ACM, New York, N.Y., USA, 2169-2172; Radu-Daniel Vatavu, Lisa Anthony, and Jacob O. Wobbrock. 2012. Gestures As Point Clouds: A $P Recognizer for User Interface Prototypes. In Proceedings of the 14th ACM International Conference on Multimodal Interaction (ICMI '12). ACM, New York, N.Y., USA, 273-280; and Jacob O. Wobbrock, Andrew D. Wilson, and Yang Li. 2007. Gestures Without Libraries, Toolkits or Training: A $1 Recognizer for User Interface Prototypes. In Proceedings of the 20th Annual ACM Symposium on User Interface Software and Technology (UIST '07). ACM, New York, N.Y., USA, 159-168] has been effective at addressing this issue for pen and touch, though attempts to generalize these techniques to higher dimensionalities have been less successful. For gesture customization, recognizers must work well with as little as one training sample per gesture class, as users may be unwilling to provide a plethora of samples for a variety of classes. Even when these constraints are relaxed, most research still only focuses on one domain or input device, e.g., KINECT, LEAP MOTION, or WII REMOTE for full body or hand gestures, and rarely does research consider general methods that might easily be adopted to any modality. Another common issue is that many researchers evaluate their methods using segmented data without addressing continuous data stream related issues. As a result, it remains unclear and confusing what might be a good starting point when one desires to incorporate gesture recognition into their work.

Iterative design is a crucial tool for HCl research in user interfaces (UI), and techniques that aid in the rapid development and exploration of such interfaces are consequently of high value. In this context, high quality, lightweight, easy to understand and fast to implement algorithms that address common UI demands are often preferred over alternative, possibly more robust industrial strength solutions. One example lies in gesture recognition. Though UI research often involves gestural interfaces, in the past, researchers required advanced knowledge of mathematics and machine learning techniques to implement robust gesture recognition. Wobbrock et al. [Jacob O. Wobbrock et al., 2007] began to address this problem when they introduced the elegant, well received $1 recognizer, which in turn spawned several similar recognizers [Lisa Anthony and Jacob O. Wobbrock, 2010; Lisa Anthony and Jacob O. Wobbrock, 2012; Yang Li, 2010; Radu-Daniel Vatavu et al., 2012]. These so-called $-family recognizers, as well as other related rapid prototyping alternatives, e.g. [J. Herold and T. F. Stahovich. 2012. The 1-cent: Recognizer: A Fast, Accurate, and Easy-to-implement Handwritten Gesture Recognition Technique. In Proceedings of the International Symposium on Sketch-Based Interfaces and Modeling (SBIM '12). Eurographics Association, Aire-la-Ville, Switzerland, Switzerland, 39-46; Eugene M. Taranta II, Andrés N. Vargas, and Joseph J. LaViola Jr. 2016. Streamlined and accurate gesture recognition with Penny Pincher. Computers & Graphics 55 (2016), 130-142; Corey Pittman, Eugene M. Taranta II, and Joseph J. LaViola, Jr. 2016. A $-Family Friendly Approach to Prototype Selection. In Proceedings of the 21st International Conference on Intelligent User Interfaces (IUI '16). ACM, New York, N.Y., USA, 370-374], rely on nearest neighbor template matching of candidate gestures to stored templates, and indeed accuracy improves with increased training samples. However, as Yang [Yang Li, 2010] discusses, a user is unlikely to provide more than one or two samples per gesture under usual conditions, which limits the potential performance of these recognizers.

Accuracy as a function of training set size is not only limited to the aforementioned techniques, as it has been shown that many other recognizers also benefit by having access to larger datasets [Javier Cano, Juan-Carlos Perez-Cortes, Joaquim Arlandis, and Rafael Llobet. 2002. Structural, Syntactic, and Statistical Pattern Recognition: Joint IAPR International Workshops SSPR 2002 and SPR 2002 Windsor, Ontario, Canada, Aug. 6-9, 2002 Proceedings. Springer Berlin Heidelberg, Berlin, Heidelberg, Chapter Training Set Expansion in Handwritten Character Recognition, 548-556; H. A. Rowley, M. Goyal, and J. Bennett. 2002. The effect of large training set sizes on online Japanese Kanji and English cursive recognizers. In Frontiers in Handwriting Recognition, 2002. Proceedings. Eighth International Workshop on. 36-40; Ondrej Velek and Masaki Nakagawa. 2002. Document Analysis Systems V: 5th International Workshop, D A S 2002 Princeton, N.J., USA, Aug. 19-21, 2002 Proceedings. Springer Berlin Heidelberg, Berlin, Heidelberg, Chapter The Impact of Large Training Sets on the Recognition Rate of Off-line Japanese Kanji Character Classifiers, 106-110]. To overcome the limitations imposed by a small training dataset, researchers have utilized synthetic data generation (SDG) methods [Randa I. Elanwar, 2013] in order to synthesize new samples from those already available. In other words, given real samples, intelligent modifications of those samples are made in order to create reasonable synthetic variation. This process is repeated to create distribution to be used to train a gesture recognizer. While SDG has proven to be useful, current techniques are unsuitable for rapid prototyping by the average developer as they are time consuming to implement, require advanced knowledge to understand and debug, or are too slow to use in real-time. The latter is especially important in UIs where users can define new gestures on demand.

$-Family Recognizers

One popular subset of rapid prototyping gesture recognizers is the $-family [Lisa Anthony and Jacob O. Wobbrock, 2010; Lisa Anthony and Jacob O. Wobbrock, 2012; Yang Li. 2010. Protractor: A Fast and Accurate Gesture Recognizer. In Proceedings of the SIGCHI Conference on Human Factors in Computing Systems (CHI '10). ACM, New York, N.Y., USA, 2169-2172; Radu-Daniel Vatavu, et al., 2012; Jacob O. Wobbrock et al., 2007]. The original $1 recognizer was pioneered nearly a decade ago by Wobbrock et al. [Jacob O. Wobbrock et al., 2007], and due to its simplicity and intuitiveness, their recognizer and its successors have enjoyed immense success. The importance of these recognizers stems from the fact that they enable HCl researchers to focus on UI design rather than fret over advanced machine learning concepts, or libraries and toolkits that may not be available for their platform. At their core, $-recognizers utilize 1-nearest neighbor pattern matching [Richard O. Duda, Peter E. Hart, and David G. Stork. 2001. Pattern Classification (2nd Edition). Wiley-Interscience], where training samples are stored as templates and a candidate gesture is measured against each template. The gesture class of the best matching template is then assigned to the candidate gesture or alternatively, an N-best list can also be provided.

As demonstrated repeatedly in various $-family recognizer evaluations, accuracy continues to improve as the number of samples per gesture increases, and while writer dependent recognition is already fairly high, writer independent gesture recognition can still be improved.

Synthetic Data Generation

The paucity of correctly labeled training data is a common problem in the field of pattern recognition [R. Navaratnam, A. W. Fitzgibbon, and R. Cipolla. 2007. The Joint Manifold Model for Semi-supervised Multi-valued Regression. In Computer Vision, 2007. ICCV 2007. IEEE 11th International Conference on. 1-8]. Crowdsourcing can help alleviate this issue, although with potentially high cost. Another alternative is to synthesize new data from that which is already available. This SDG process has been used successfully in many fields, including human pose recognition [J. Shotton, A. Fitzgibbon, M. Cook, T. Sharp, M. Finocchio, R. Moore, A. Kipman, and A. Blake. 2011. Real-time Human Pose Recognition in Parts from Single Depth Images. In Proceedings of the 2011 IEEE Conference on Computer Vision and Pattern Recognition (CVPR '11). IEEE Computer Society, Washington, D.C., USA, 1297-1304], digital forensics [Javier Galbally, Julian Fierrez, Marcos Martinez-Diaz, and Javier Ortega-Garcia. 2009. Synthetic generation of handwritten signatures based on spectral analysis. In SPIE Defense, Security, and Sensing. International Society for Optics and Photonics, 730629-730629; Emilie Lundin, Håkan Kvarnström, and Erland Jonsson. 2002. A Synthetic Fraud Data Generation Methodology. In Proceedings of the 4th International Conference on Information and Communications Security (ICICS '02). Springer-Verlag, London, UK, UK, 265-277], information retrieval [B. Gatos, T. Konidaris, K. Ntzios, I. Pratikakis, and S. J. Perantonis. 2005. A Segmentation-free Approach for Keyword Search in Historical Typewritten Documents. In Proceedings of the Eighth International Conference on Document Analysis and Recognition (ICDAR '05). IEEE Computer Society, Washington, D.C., USA, 54-58; Jose A. Rodriguez-Serrano and Florent Perronnin. 2012. Synthesizing queries for handwritten word image retrieval. Pattern Recognition 45, 9 (2012), 3270-3276. Best Papers of Iberian Conference on Pattern Recognition and Image Analysis (IbPRIA '2011)] and handwriting recognition of ancient texts [Andreas Fischer, Muriel Visani, Van Cuong Kieu, and Ching Y. Suen. 2013. Generation of Learning Samples for Historical Handwriting Recognition Using Image Degradation. In Proceedings of the 2Nd International Workshop on Historical Document Imaging and Processing (HIP '13). ACM, New York, N.Y., USA, 73-79], as well as in generating [Ahmad-Montaser Awal, Harold Mouchere, and Christian Viard-Gaudin. 2009. Towards Handwritten Mathematical Expression Recognition. In Document Analysis and Recognition, 2009. ICDAR '09. 10th International Conference on. 1046-1050; Faisal Farooq, Damien Jose, and Venu Govindaraju. 2009. Phrase-based Correction Model for Improving Handwriting Recognition Accuracies. Pattern Recogn. 42, 12 (December 2009), 3271-3277] and collecting [Scott MacLean, David Tausky, George Labahn, Edward Lank, and Mirette Marzouk. 2009. Tools for the Efficient Generation of Handdrawn Corpora Based on Context-free Grammars. In Proceedings of the 6th Eurographics Symposium on Sketch-Based Interfaces and Modeling (SBIM '09). ACM, New York, N.Y., USA, 125-132] large data sets.

Early examples of SDG in gesture and handwriting recognition include works by Ha and Bunke [T. M. Ha and H. Bunke. 1997. Off-line, handwritten numeral recognition by perturbation method. IEEE Transactions on Pattern Analysis and Machine Intelligence 19, 5 (May 1997), 535-539] and thereafter, a number of researchers have also attacked this problem as reported in Elanwar's survey [Randa I. Elanwar, 2013]. One key difference in their approaches relates to whether the data is digital ink or images of symbols. Methods that work on ink can broadly be divided into two categories: those that replicate feature distributions of the population (such as pen-lifts and velocity) and those that apply perturbations to the given data. The former approach requires at least a small set of data to begin with, which may not exist and is why a perturbation approach is taken. A third option, however, involves the interactive design of procedurally generated gestures, such as that provided by Gesture Script [Hao Lü, James A. Fogarty, and Yang Li. 2014. Gesture Script: Recognizing Gestures and Their Structure Using Rendering Scripts and Interactively Trained Parts. In Proceedings of the SIGCHI Conference on Human Factors in Computing Systems (CHI '14). ACM, New York, N.Y., USA, 1685-1694], though user intervention still poses a drawback.

Concerning image based techniques, Helmers et al. [Muriel Helmers and Horst Bunke. 2003. Generation and use of synthetic training data in cursive handwriting recognition. In Pattern Recognition and Image Analysis. Springer, 336-345] proposed an approach to produce synthetic text in which isolated samples of an individual's handwriting are concatenated together to form synthetic handwritten text. Ha and Bunke [T. M. Ha and H. Bunke, 1997] along with Cano et al. [Javier Cano et al., 2002] leveraged various image transformation operations (e.g., as erode, dilate, etc.) to produce variations of image samples of handwritten characters. Varga et al. [Tamás Varga and Horst Bunke. 2003. Generation of synthetic training data for an HMM-based handwriting recognition system. In Document Analysis and Recognition, 2003. Proceedings. Seventh International Conference on. 618-622 vol. 1; Tamás Varga and Horst Bunke. 2004. Offline handwriting recognition using synthetic training data produced by means of a geometrical distortion model. International Journal of Pattern Recognition and Artificial Intelligence 18, 07 (2004), 1285-1302; Tamás Varga, Daniel Kilchhofer, and Horst Bunke. 2005. Template-based synthetic handwriting generation for the training of recognition systems. In Proceedings of the 12th Conference of the International Graphonomics Society. 206-211] used randomly generated geometrical transformations such as scaling and shearing lines of handwritten text to produce new synthetic lines. Such transformations have also been applied towards the creation of synthetic CAPTCHAs [Achint Oommen Thomas, Amalia Rusu, and Venu Govindaraju. 2009. Synthetic Handwritten CAPTCHAs. Pattern Recogn. 42, 12 (December 2009), 3365-3373]. Lee et al. [Do-Hoon Lee and Hwan-Gue Cho. 1998. A new synthesizing method for handwriting Korean scripts. International Journal of Pattern Recognition and Artificial Intelligence 12, 01 (1998), 45-61] generated synthetic Korean characters using Beta distribution curves while Varga et al. [Tamás Varga, Daniel Kilchhofer, and Horst Bunke. 2005. Template-based synthetic handwriting generation for the training of recognition systems. In Proceedings of the 12th Conference of the International Graphonomics Society. 206-211] used Bezier splines to generate handwritten English text. Caramiaux et al. [Baptiste Caramiaux, Nicola Montecchio, Atau Tanaka, and Frédéric Bevilacqua. 2014. Adaptive Gesture Recognition with Variation Estimation for Interactive Systems. ACM Trans. Interact. Intell. Syst. 4, 4, Article 18 (December 2014), 34 pages] generated synthetic samples drawn from Viviani's curve to produce controlled data to evaluate their proposed adaptive gesture recognizer. Dinges et al. [Laslo Dinges, Moftah Elzobi, Ayoub Al-Hamadi, and Zaher Al Aghbari. 2011. Image Processing and Communications Challenges 3. Springer Berlin Heidelberg, Berlin, Heidelberg, Chapter Synthesizing Handwritten Arabic Text Using Active Shape Models, 401-408] used active shape models which rely on the linear combination of the eigenvectors of the covariance matrix built for each class of shapes to create synthetic handwritten text.

Perturbation models such as Perlin noise [Ken Perlin. 1985. An Image Synthesizer. In Proceedings of the 12th Annual Conference on Computer Graphics and Interactive Techniques (SIGGRAPH '85). ACM, New York, N.Y., USA, 287-296] and the SigmaLognormal [Réjean Plamondon and Moussa Djioua. 2006. A multi-level representation paradigm for handwriting stroke generation. Human movement science 25, 4 (2006), 586-607] model have been proven to be strong contenders for SDG. Since these methods will be used in the evaluations that will be discussed herein as this specification continues, a more in depth description of each follows.

Perlin Noise.

Davila et al. [Kenny Davila, Stephanie Ludi, and Richard Zanibbi. 2014. Using off-line features and synthetic data for on-line handwritten math symbol recognition. In Frontiers in Handwriting Recognition (ICFHR), 2014 14th International Conference on. IEEE, 323-328] used Perlin noise maps [Ken Perlin, 1985], a well-known technique in computer graphics for producing natural looking synthetic textures, to generate synthetic math symbols. Each Perlin map consists of a grid of points. The number of points defines the resolution of the map. A gradient direction is assigned to each point and random noise is generated based on the direction of the gradient. Synthetic samples are created by coinciding the gesture's stroke points on the noise map and moving each stroke's points along the grid's gradient direction. A discriminating factor of Perlin noise is that it modifies individual sample points, whereas certain embodiments of the current invention modify the gesture's path, which will become clearer as this specification continues.

Sigma-Lognormal Model.

Although numerous models have been proposed to describe human movement, the kinematic theory of rapid human movement [Réjean Plamondon. 1995. A kinematic theory of rapid human movements. Biological cybernetics 72, 4 (1995), 295-307] and its associated Sigma-Lognormal (ΣΛ) model [Réjean Plamondon and Moussa Djioua, 2006] has been shown to have superior performance in modeling human movement, and has been successfully applied to a large range of applications [D. Martín-Albo, R. Plamondon, and E. Vidal. 2015. Improving sigma-lognormal parameter extraction. In Document Analysis and Recognition (ICDAR), 2015 13th International Conference on. 286-290]. The ΣΛ equations (including Equations 1 and 2) attempt to model the complex interactions of a neuromuscular network executing an action plan. That is, a stroke is described by a set of overlapping primitives connecting a series of virtual targets [Luis A. Leiva et al., 2015, Daniel Martín-Albo, and Réjean Plamondon. 2015. Gestures À Go Go: Authoring Synthetic Human-Like Stroke Gestures Using the Kinematic Theory of Rapid Movements. ACM Trans. Intell. Syst. Technol. 7, 2, Article 15 (November 2015), 29 pages], where each primitive is described by a lognormal equation. Formally, the velocity profile of a trajectory is given by:

$$\vec{v}(t) = \sum_{i=1}^{N} \vec{v}(t) = \sum_{i=1}^{N} D_i \begin{bmatrix} \cos\phi_i(t) \\ \sin\phi_i(t) \end{bmatrix} \Lambda(t; t_0, \mu_i, \sigma_i^2), \qquad (1)$$

which is the vectorial summation of n primitives. Each primitive is a four-parameter lognormal function scaled by $D_i$ and time shifted by $t_i$, where $\mu_i$ represents a neuromuscular time delay and $\sigma$, the response time.

The angular position of a primitive is also given by:

$$\phi_i(t) = \theta_{s_i} + \frac{\theta_{e_i} - \theta_{s_i}}{2}\left[1 + erf\left(\frac{\ln(t_i - t_0) - \mu_i}{\sigma_i\sqrt{2}}\right)\right] \qquad (2)$$

where $\theta_{si}$ and $\theta_{ei}$ are starting and ending angles of the ith primitive. A parameter extractor such as that described by Martín-Albo et al. [D. Martín-Albo et al., 2015] is used to find the individual primitives and their associated model parameters for a given stroke. Perturbations to model parameters create realistic variations in the trajectory and can be used to create synthetic gestures, such as for whiteboard note generation [A. Fischer, R. Plamondon, C. O'Reilly, and Y. Savaria. 2014. Neuromuscular Representation and Synthetic Generation of Handwritten Whiteboard Notes. In Frontiers in Handwriting Recognition (ICFHR), 2014 14th International Conference on. 222-227]. Leiva et al. [Luis A. Leiva et al., 2015] recently introduced the Gestures à Go Go (G3) web service to provide synthetic samples from real data using kinematic theory. They were also able to show that $-family recognizers trained with only synthetically generated samples could perform as well as recognizers trained with only human samples. However, the overhead of model parameter extraction is still considered a drawback of this methodology.

Despite decades of research, there is yet no general rapid prototyping recognizer for dynamic gestures that can be trained with few samples, work with continuous data, and achieve high accuracy that is also modality-agnostic. Accordingly, what is needed is a system and method that is computationally efficient, has minimal coding overhead, and is capable of achieving higher accuracy than conventional techniques. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for synthetic data generation is now met by a new, useful, and nonobvious invention.

In an embodiment, the current invention is a method of generating a synthetic variant of a given input. In another embodiment, the current invention is one or more tangible non-transitory computer-readable media having computer-executable instructions for performing a method of running a software program on a computing device, the computing device operating under an operating system, the method including issuing instructions from the software program to generate a synthetic variant of a given input.

An input time series of K points is received to and recorded on a computer-readable storage device. The time series is stochastically resampled into a first set of n points, where a path distance between the n points is non-uniform. A direction vector between each consecutive pair of points is extracted and normalized to a unit length. This direction vector is lengthened or shortened as a result of the resampling and normalization. The resulting plurality of normalized direction vectors are concatenated to create a second set of n points. In certain embodiments, synthetic strokes are generated via these extraction, normalization, and concatenation steps. The origin of the first vector in the series is at the center of a coordinate system, and the resulting series forms a shape that can be translated, scaled, skewed, and rotated as necessary. The synthetic variant is then outputted based on the formed shape. Optionally, the synthetic variant may be smoothed. It should be noted here that the perturbations are simulated directly on the given input itself.

Prior to resampling, statistical features (e.g., closedness, density) may be extracted from the time series. In this case, a cardinality of the first set of n points is established based on those extracted statistical features. For example, the optimal n value can be determined based on Equation 11, which will be discussed as this specification continues.

Prior to extracting and normalizing the direction vector between adjacent points, a subset of n points can be randomly selected from the first set of n points along the series' path. This randomly selected subset of n points can then be removed from the first set of n point, where the remaining unremoved n points (and direction vectors therebetween) are the ones that undergo the extraction and normalization step.

When the given input is a multistroke gesture, the underlying strokes are randomly permuted, and a random subset of those strokes are reversed. The strokes are combined into the time series prior to resampling. Subsequently after the normalization and concatenation steps, over-the-air points are discarded, thereby resulting in the synthetic variant being a synthetic multistroke gesture.

The methodology described above may be repeated to generate a plurality of synthetic variants. In this case, the synthetic variants can be measured against the given input (e.g., using 1-nearest neighbor classification), thus generating a synthetic in-class measurements probability distribution from the measurements (based on synthetic in-class input samples, e.g., generated by SR and direction vector normalization) and also an out-of-class measurements probability distribution from out-of-class measurements (based on non-input samples). Using these probability distributions, a rejection threshold may be established. The rejection threshold minimizes the probability of false negative errors and false positive errors.

This rejection threshold may be established, for example, by selecting an objective function to be maximized and estimating a value of the objective function using the probability distributions. The estimates are made at each point along a range of measurement values of the combined probability distributions. Based on this, a measurement value that maximizes the objective function can be determined. This measurement value is the rejection threshold.

This methodology of generating synthetic data may have a variety of implementations. For example, it can be used to train a gesture recognizer with a synthetic samples distribution that is generated based on the synthetic variants outputted. In another example, the methodology can be used for image generation, where each stroke is stochastically resampled to generate a sketched image. In yet another example, the given input may be an input image, edges are extracted from that input image, and variants of that image can be generated. In this last case, the edges within the input image would be stochastically resamples to generate a synthetic, non-photorealistic variant of the initial input image.

In a separate embodiment, the current invention includes any one or more—or even all—of the foregoing features and characteristics, for example in a specific implementation of training a gesture recognizer.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The design of the current synthetic data generation method was motivated by several objectives. First, as a rapid prototyping technique, the approach should be easily accessible to the average developer—understood with little effort and without expert knowledge, and consequently fast to implement as well as easy to debug. Yet even with its reduced complexity, improvements in recognition accuracy must remain competitive as compared to conventional state-of-the-art SDG methods discussed previously. For the sake of adoptability, the approach should utilize only spatial coordinates given that timing and pressure information may be unreliable or even unavailable, but more importantly, artificial gestures should be synthesized with minimal computational overhead. Further, synthetic gestures should have a realistic appearance, not only for display purposes, but because severely deformed synthetic samples may lead to poor recognizer performance. Finally, the method should fit orthogonally and be complementary to already available gesture recognition techniques so that existing machinery might be leveraged without significant modification if desired.

Figure 1:
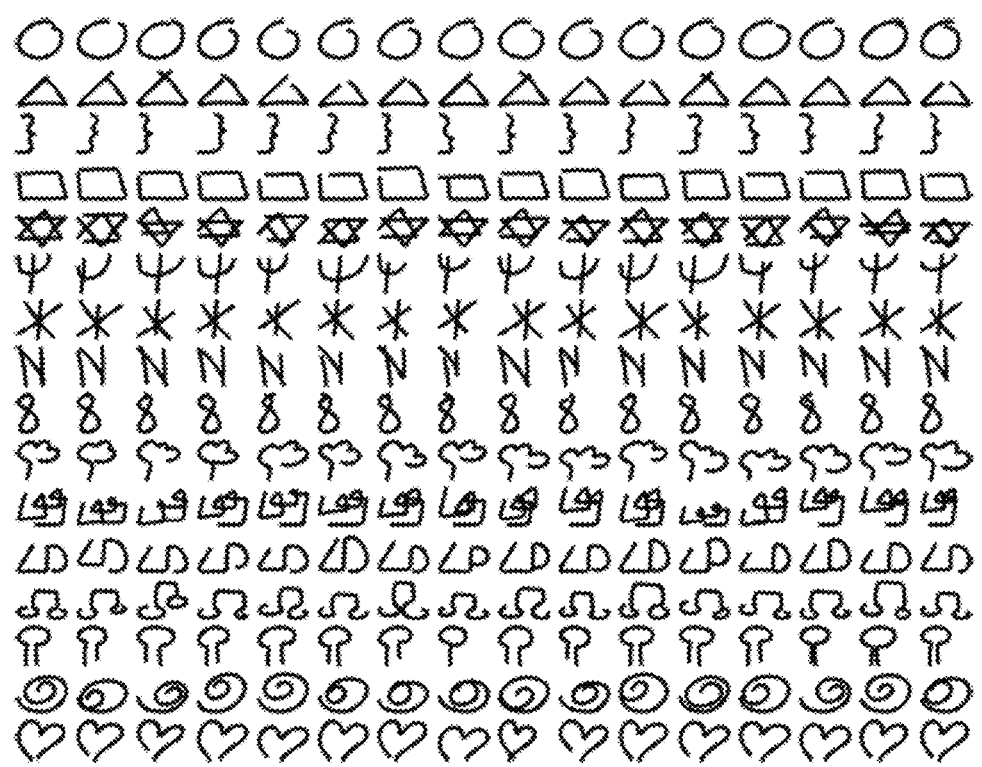
FIG. 1 depicts an example synthetic gestures from $1-GDS [Jacob O. Wobbrock et al., 2007], MMG [Lisa Anthony and Jacob O. Wobbrock, 2012], EDS 1 [Radu-Daniel Vatavu, Daniel Vogel, Géry Casiez, and Laurent Grisoni. 2011. Estimating the Perceived Difficulty of Pen Gestures. In Proceedings of the 13th IFIP TC 13 International Conference on Human-computer Interaction—Volume Part II (INTERACT '11). Springer-Verlag, Berlin, Heidelberg, 89-106], and EDS 2 [Id.], four each top to bottom respectively. The first column of each row is the original sample from which the remaining synthetic gestures are derived. All gestures are smoothed.
Figure 2:
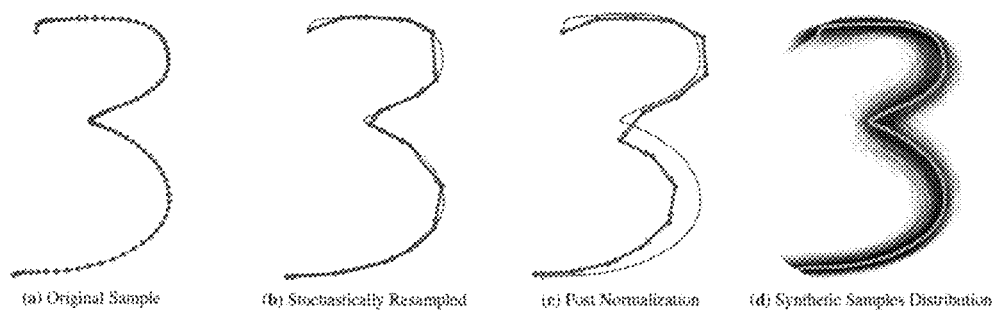
FIG. 2 is an illustration of a stochastic resampling process, according to an embodiment of the current invention.

In an embodiment, the current invention is a rapid prototyping appropriate SDG method called stochastic resampling (SR). This method utilizes nonuniform resampling of gesture paths and subsequent normalization of the in-between point vectors [Eugene M. Taranta et al., 2016] to produce realistic synthetic samples (see FIGS. 1-2). SR generates synthetic samples by lengthening and shortening gesture subpaths within a given sample to produce realistic variations of the input via the nonuniform resampling. As such, SR is an appropriate rapid prototyping technique where ease of use, understandability, and efficiency are desired.

Figure 3:
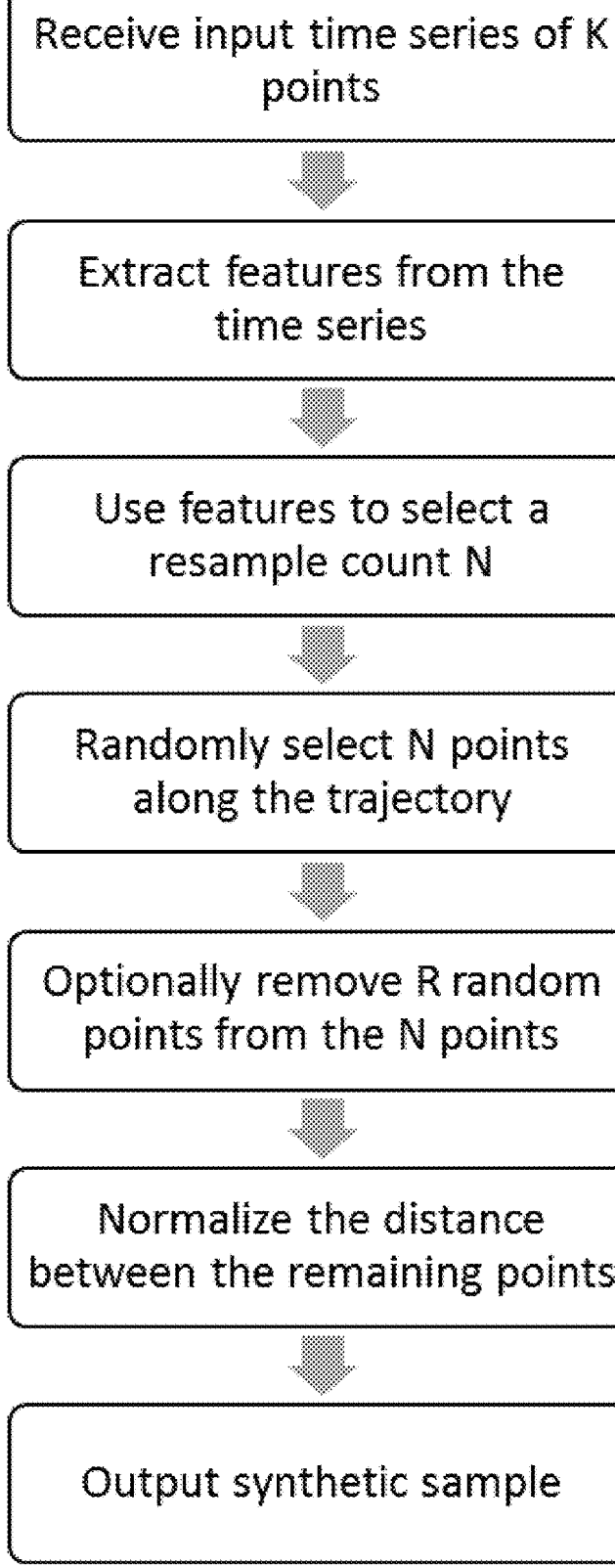
FIG. 3 is a flowchart depicting a step-by-step process of outputting a synthetic sample using stochastic resampling.
Figure 4:
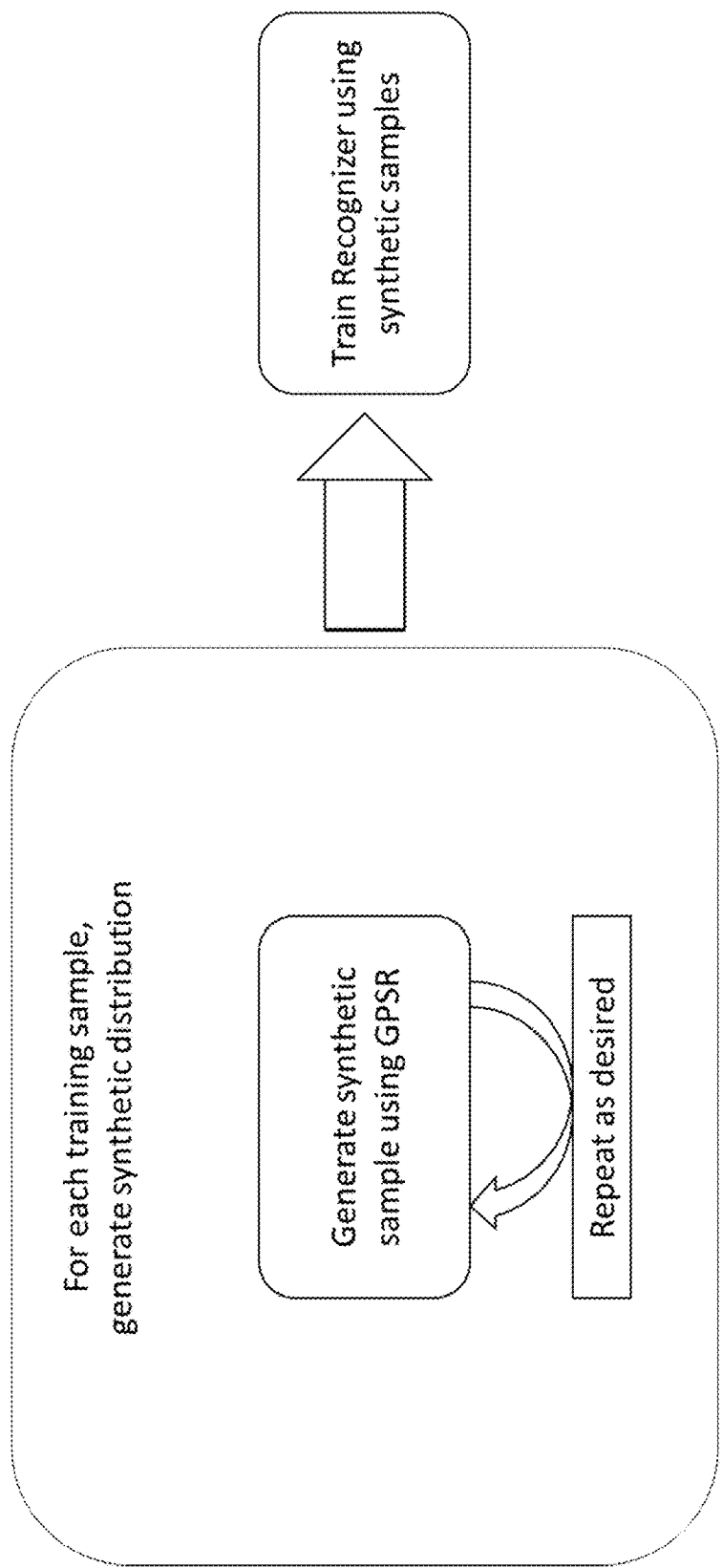
FIG. 4 is a flowchart depicting a step-by-step process of training a gesture recognizer using synthetic samples generated via stochastic resampling.

In certain embodiments, as seen in FIG. 3, the current invention contemplates a general two-step approach to generating synthetic data. Given a sample, the gesture path of that sample is stochastically resampled. Numbers are drawn from random distribution, catenated together, and normalized. Thereafter, sampling points (n) between 0 and 1 are assigned along the gesture path where samples can be taken. In the second step, the distances between the points are normalized, thereby lengthening or shortening the gesture path. In essence, the action plan is being modified similar to a writer creating that gesture. The timing information along the gesture is thereby changed as well. This new synthetic variant can then optionally be smoothed, though smoothing may not be necessary, for example if rendering to train a recognizer (see FIG. 4). This process is repeated to create a distribution rapidly (e.g., in under 1 second). This distribution can be used in any desired manner, for example to establish a rejection threshold, to train a gesture recognizer, to create artwork, to generate a non-photorealistic image of a picture, among other applications. These will become clearer as this specification continues.

A primary determination to be made is selection of the resampling rate, i.e., the optimal n, where n is the number of sampling points to be drawn. For example, for certain shapes such as a right curly brace, resampling to n=16 points is sufficient for the shape to be recognizable, and while n=64 points appears to have good distribution and recognizability, the resulting variability is overly restrictive. For other shapes such as a triangle chain, n=16 is insufficient and would lead to degenerate results, as variability is too high. However, n=64 points appears to have good distribution and recognizability for the triangle chain, and it is not overly restrictive like it was for the right curly brace. Overall, the objective is to determine a function of a given sample/gesture path that would provide a reasonable value of n that can be used to create a synthetic distribution. It can be seen that the value of n is highly dependent on each specific gesture.

To accomplish this objective, for example, for a given gesture, all samples are taken to find the centroid. Using the centroid, similarity to every other sample of that gesture in the data set is found. The average of that similarity provides a way to characterize the distribution. A plurality of synthetic distributions is then created, each with a different value of n, and the distribution that most closely resembles the real distribution of the sample/gesture is found. Features of the gesture path are then extracted and regressed on the optimal n. Specifically, with the given gesture and other gestures from other data sets, features are extracted and regressed to find the function desired.

Features that are used should fit within the rapid prototyping paradigm, and the two primary features found were closedness and density. Closedness refers to distance between the first and last point in the gesture; as such, a more closed gesture leads to a higher value of n needed. Density refers to the path length divided by the size of the gesture (i.e., length of entire path within a diagonal of a bounding box around the gesture); as such, more complex gestures are more dense and lead to a higher value of n needed. Combining closedness and density leads to a simple parsimonious equation that provides a reasonable value of n of any particular sample. This will become clearer as this specification continues.

An extensive evaluation on this technique was conducted, and it will be shown herein that using this method, accuracy significantly improves when gesture recognizers are trained with SR synthetic samples. SR improves the recognition accuracy of several rapid prototyping recognizers and two parametric recognizers. In some cases, mean recognition errors are reduced by more than 70%, and in most cases, SR outperforms other evaluated state-of-the-art SDG methods. This being said, accuracy is not the only objective, as it is also shown through an analytical evaluation that SR is able to generate realistic distributions of synthetic samples. In a user study, it was found that participants were unable to distinguish SR synthetic samples from real samples, which is untrue of the conventional SDG techniques.

Similar in nature to the $\Sigma\Lambda$ model [Luis A. Leiva et al., 2015], one may think of a gesture as being described by a canonical velocity profile that is based on an action plan defining the gesture's shape. To recreate the gesture, a writer must execute the plan with a certain level of fidelity. Minor variability due to perturbations in the velocity profile will yield recognizable, yet uniquely different shapes, and so long as the writer's variation is reasonable, global characteristics of the shape will remain intact. However, rather than extract complex model parameters from a given sample and perturb the parameters post hoc, the current methodology contemplates simulating reasonable perturbations on the sample directly.

Similar to perturbations on $\Sigma\Lambda$ model parameters that change the velocity profile by modifying delay and response times, SR is also a mechanism of changing the timing profile of a stroke, so that gesture subpaths are lengthened and shortened as a result of the resampling strategy. However, the current approach uses the input directly, without requiring the overhead of model parameter extraction.

Figure 5:
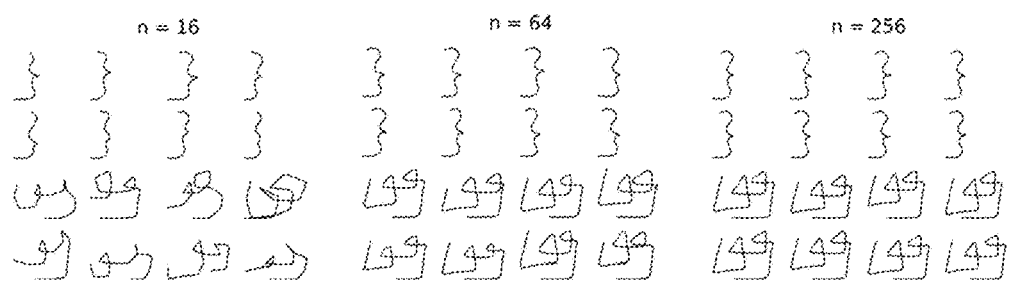
FIG. 5 depicts effect of n on gestures of different complexity—left curly brace [Jacob O. Wobbrock et al., 2007] (top) and triangle chain [Radu-Daniel Vatavu et al., 2011] (bottom).

As a first step, perturbations that result in the lengthening or shortening of gesture subpaths are considered. To simulate such deviations from the action plan, consider resampling a stroke to n points so that the path length is nonuniform between points. Call any vector between two contiguous points along the gesture path an in-between point direction vector [Eugene M. Taranta II et al., 2016]. Now normalize all in-between point vectors to unit length and observe that for any two arbitrary vectors, the ratio of their lengths is altered as a result of the transformation. This approach is analogous to modifying the gesture path length between each pair of contiguous points, which is illustrated in FIG. 5—some in-between point vectors will have been shortened while others will have been lengthened. It can be seen that each nonuniform resampling and subsequent normalization will lead to a different shape, and that repeated distribution of synthetic gestures can be generated from a single sample.

Formally, let $\xi_1=0$ and $\xi_2, \ldots, \xi_n$ be a random sample of size n-1 from a uniform $U(1, 1+\sqrt{12}*\sigma^2)$ population. Define an ordered list of gesture path ratios using the random sample:

$$r = \left( \left( r_i = \frac{\sum_{j=1}^{i} \xi_j}{\Sigma \xi} \right) \middle| i = 1 \ldots n \right), \quad (3)$$

so that $0=r_1 < r_i < r_{i+1} < r_n = 1$. Further, a stroke is defined as an ordered list of 2D points $p=(p_i=(x_i,y_i)|i=1 \ldots n)$, L is the arc-length of the gesture path through all points from $p_1$ to $p_n$, and $L(p_i)$ is the arc-length distance to point $p_i$ [Radu-Daniel Vatavu, Lisa Anthony, and Jacob O. Wobbrock. 2013. Relative Accuracy Measures for Stroke Gestures. In Proceedings of the 15th ACM on International Conference on Multimodal Interaction (ICMI '13). ACM, New York, N.Y., USA, 279-286]. Similarly, $L^{-1}(d)$ is denoted as the inverse arc-length function that returns the point $p_x$ at distance d along the gesture path. Now define an ordered list of stochastic points using the ratios as follows:

$$q=(q_i=L^{-1}(r_i L)|i=1 \ldots n) \quad (4)$$

The in-between point vectors derived from the stochastic points are $v=(v_i=(q_{i+1}-q_i)|i=1 \ldots n-1)$, from which a synthetic stroke is generated:

$$p' = \left( p'_i = p'_{i-1} + \frac{v_{i-1}}{\|v_{i-1}\|} \middle| i = 2 \ldots n \right), \quad (5)$$

where $p'_1=(0,0)$. The synthetic stroke p' can then be scaled, translated, rotated, and smoothed as desired.

A uniform random distribution is used after finding inconsequential differences between the uniform, normal, exponential, and beta distributions, which was contrary to the poor performing log-normal distribution. The lower bound of the uniform distribution was set to 1 only to avoid any probability of drawing 0, and the upper bound is a function of e so that the spread of the distribution can optionally tuned.

Removals.

Another type of variation occurs when a writer skips over some detail of the action plan, such as when a gesture stroke is not fully articulated or when a corner is cut. To simulate this in a general way, the removal count x is introduced that, when specified, indicates how many points from the stochastic stroke q are randomly removed before generating the synthetic stroke p'. When removals are used, n should be adjusted to account for this reduction. Therefore, from hereon and for clarity, n refers to the length of the final synthetic stroke after the removal of x points, and implicitly the length of $\xi$, r, and q become n+x.

Multistroke Support.

Thus far, the creation of single stroke synthetic gestures has been discussed herein. With only a few modifications, stochastic resampling can also work with multistroke gestures. In a preprocessing step, first randomly permute the stroke set and randomly reverse a subset of these strokes before combining them together into a single ordered list of points p. In addition to 2D coordinate data, each point also now possesses an integer stroke ID. Stochastically resample p as before, while also interpolating the stroke ID as one does with 2D coordinates. Lastly, generate the synthetic sample, but break apart the unistroke p' by discarding "over the air" points whose stroke IDs are between integer values. This results in a synthetic multistroke gesture, and example results are shown in the second four rows FIG. 1.

Example 1

A. Parameter Selection

In certain embodiments, the current invention contemplates the selection of three parameters: variance $\sigma^2$, removal count x, and resampling count n. With respect to variance $\sigma^2$, it was found that this parameter had little influence on recognizer accuracy—any variance setting was sufficient to achieve good results. Therefore, $\sigma^2=0.25$ was used, and the parameter was held constant for the remainder of the analysis.

Removal count x, on the other hand, had a noticeable impact on synthetic gesture quality. At x=2, recognition accuracy results were indeed improved, but as x increased, gesture quality rapidly deteriorated. For this reason, the removal count was held constant at two.

The resampling count n had the biggest impact on accuracy and gesture quality. As illustrated in FIG. 5, one can see that the selection of n significantly impacted synthetic gesture generation. With a low resolution such as with n=16, the left curly brace [Jacob O. Wobbrock et al., 2007] has reasonable variation between samples, but most triangle-chain [Radu-Daniel Vatavu et al., 2011] samples are unrecognizable. At n=64 there is practically no variation between left curly brace samples, though triangle chain samples are now improved and have a healthy variation.

Finally, at n=256, there appears to be almost no variation for either gesture. These observations provided motivation to find a function of n based on properties of the gesture that yielded reasonable results—a function that can analyze an individual gesture sample and select an optimal resample count n to apply.

In order to decide on an optimal resampling strategy, the effect of n on various geometric relative accuracy measures [Radu-Daniel Vatavu et al., 2013] was considered. Namely, these measures were used to analyze how well a population of synthetic gesture samples matches a population of human generated samples. To start, Vatavu et al. [Id.] define the shape error (ShE) of a candidate gesture to be a measure of deviation from the gesture class's canonical form:

$$ShE(p) = \frac{1}{n}\sum_{i=1}^{n} \|p_{\sigma(i)} - \overline{p}_i\|, \quad (6)$$

where p is the canonical point series and $\sigma(i)$ is a permuter of the candidate gesture points, which is used to find an optimal alignment. Shape variability (ShV) measures the standard deviation of the individual shape errors. Thereafter, bending error (BE) is a measure of average deviation from the absolute curvature of the gesture class's canonical form:

$$BE(p) = \frac{1}{n}\sum_{i=1}^{n-2} |\theta_{\sigma(i)} - \overline{\theta}_i|, \quad (7)$$

where $\theta_i$ is the turning angle between in-between point vectors i and i+1. Bending variability (BV) again is the variance of these individual errors.

Using a similar evaluation methodology to that described, all four relative accuracy measures for n∈{8, 16, 32, 64, 128} were calculated. It was found that the ShE and ShV were significantly correlated (r(549)=0.91, p<0.0001), as were BE and BV (r(549)=0.80, p<0.0001). Given this strong correlation between the error and variance metrics, the ShE and BE became the focal points. Specifically, mean ShE and mean BE were of interest for a population of gesture samples.

To differentiate between the real population and a synthetic population, these means are referred as the real ShE (BE) and syn ShE (BE), respectively. The objective therefore is to minimize the difference between real and synthetic populations, which hereafter is the mean ShE percentage error:

$$ShE \% Err = \frac{100}{G}\sum_{i=1}^{G} \frac{|real\ ShE - syn\ ShE|}{real\ ShE} \quad (8)$$

where G is the number of gestures under consideration, and the mean BE percentage error is defined similarly. To carry out the investigation, the five datasets described in Table 1 were utilized. With exception to LP Training [Eugene M. Taranta II et al., 2016], these datasets have been widely used in various studies except; the LP Training dataset was included only to help avoid overfitting, given that it replicates a number of gestures found in the other datasets.

TABLE 1

Datasets used in evaluations.

| Name | Ref | Multistroke | Gestures | Participants |
| --- | --- | --- | --- | --- |
| $1-GDS | Wobbrock et al., 2007 | No | 16 | 10 |
| EDS 1 | Vatavu et al., 2011 | No | 18 | 14 |
| EDS 2 | Vatavu et al., 2011 | No | 20 | 11 |
| LP Training | Taranta et al., 2016 | No | 40 | 24 |
| MMG | Anthony et al., 2012 | Yes | 16 | 20 |

For a given gesture, all samples were first scaled and aligned (n=16 as a lower bound, since lower values can result in poorly malformed gestures) within the population, after which the procedure described by Vatavu et al. [Radu-Daniel Vatavu, Lisa Anthony et al., 2013] was followed to select the average template. That is, all samples were uniformly resampled to a fixed number of points, the mean of the population was calculated, and the sample closest to the mean was selected to serve as the canonical (centroid) sample of the gesture class. However, because all strokes were first aligned, the permuter $\sigma(i)$ was chosen to be the identity permutation. With the canonical gesture in hand, the optimal n that minimized the ShE percentage error was found—for each value of the n tested, 512 synthetic samples were created. With these samples, the syn ShE was then calculated. Note that ShE was prioritized at this stage because the metric relies on point correspondences which directly, and sometimes indirectly, relates to the distance metric employed by various rapid prototyping gesture recognizers. Further, it was also assumed that improvements in ShE error would lead to improvements in BE error.

Since a goal was to find a function of n based on properties of a given sample, seven features derived from summaries provided by Blagojevic et al. [Rachel Blagojevic, Samuel Hsiao-Heng Chang, and Beryl Plimmer. 2010. The Power of Automatic Feature Selection: Rubine on Steroids. In Proceedings of the Seventh Sketch-Based Interfaces and Modeling Symposium (SBIM '10). Eurographics Association, Aire-la-Ville, Switzerland, Switzerland, 79-86] were considered: curvature, absolute curvature, closedness, direction changes, two density variants, and stroke count. In addition to optimal n, these features were also extracted from the centroid sample. Then using stepwise regression, those features that best explained the variability of the 110 gestures were identified (see Table 1). In the end, two features were identified that together achieved high performance:

$$\text{closedness} = 1 - \frac{\|p_n - p_1\|}{\text{diag}} \quad (9)$$

and, $$\text{density} = \frac{\mathcal{L}}{\text{diag}}, \quad (10)$$

where diag is the gesture's bounding box diagonal length. Absolute curvature actually accounted for negligibly higher variability over density, but since the feature may be unreliable due to jitter or wobbling and because density is a simpler approach, a parsimonious solution was favored. Now with good features selected, multiple linear regression was performed to find an equation for optimal n. A significant regression equation was found (R2=0.59, F(2, 109)=75.62, p<0.0001). The intercept (p<0.0001), density (p<0.0007) and closedness (p<0.0001) parameters were significant, yielding the following equation:

$$n = \exp\{1.67 + 0.29 \text{ density} + 1.42 \text{ closedness}\} \quad (11)$$

Further, the cross validated coefficient of determination ($Q^2$=0.56) was approximately equal to $R^2$=0.59, which is another indication of a good fit. Residuals were also confirmed to be statistically normal using a Shapiro-Wilks test (W=0.99, p=0.37).

$R^2$=0.59 was considered to be a good result because there is a great deal of variability between datasets. For instance, some selected differences in real ShE are the heart gesture at 0.061 and 0.142; rectangle at 0.045 and 0.054; five point star at 0.099 and 0.135; and triangle at 0.056 and 0.081. These differences are likely related to how the datasets were collected, including the device, instructions, and software used. By applying the optimal n equation to each of the 110 gesture centroids from Table 1, it was found that the n values range from 16 to 69, and have a mean of 31 (SD=13.1).

i. Evaluation of Optimal n

To understand if optimal n (Equation 11) is effective at simulating a realistic distribution, the relative metrics was calculated over varying n∈{8, 16, 32, 64} and optimal n. Results can be found in Table 2.

TABLE 2

Mean gesture recognition percentage error (and SD) over all template matching recognizers for one and two training samples per gesture, from which 64 gestures are synthesized per training sample on $1-GDS [Wobbrock et al., 2007], MMG [Anthony et al., 2012], EDS 1 [Vatavu et al., 2011], and EDS 2 [Vatavu et al., 2011], as well as the ShE and BE percentage errors. Note that the optimal n value ranges from about 16 to about 69 depending on the gesture's centroid.

| n | Rec & Error | ShE % Err | BE % Err |
|---|---|---|---|
| Optimal | 3.47 (3.81) | 26.06 (21.24) | 21.15 (15.23) |
| 8 | — | 1137.72 (9538.78) | 95.86 (85.58) |
| 16 | 4.68 (5.05) | 80.22 (67.82) | 33.37 (37.34) |
| 32 | 3.80 (3.98) | 38.85 (25.14) | 25.27 (17.28) |
| 64 | 4.20 (4.18) | 44.44 (24.04) | 33.63 (14.18) |

Overall, optimal n had the lowest ShE percentage error (M=26%, SD=21%), and, as compared to its runner up n=32 (M=39%, SD=25%), the result was statistically significant based on a Wilcoxon signed-ranks test (p<0.0001). Similarly, optimal n also had the lowest BE percentage error (M=21%, SD=15%) that again, compared to n=32 (M=25%, SD=17%), was significant (p<0.004).

Further, to ensure the current approach did not degrade recognizer performance (e.g., by reducing or overinflating population variance as compared to other static values of n), recognition accuracy was also evaluated for each level. Optimal n achieved the lowest mean error 3.47% (SD=3.81) for one and two training samples expanded into 64 synthetic gestures per sample, using unistroke recognizers on unistroke datasets and multistroke recognizers on MMG [Lisa Anthony and Jacob O. Wobbrock, 2010]. The second closest was n=32, having a mean error of 3.80% (SD=3.98); however, the difference between levels was not significant (F(3, 220)=0.4093, n.s.).

As a result of this analysis, it was determined that optimal n (which is unique per sample) is able to synthesize a gesture population more precisely than any static value of n. This is highly desirable, because for unknown datasets, the probability of generating unrealistic samples that cross the decision boundary between gestures classes should be reduced, because malformed gestures have the potential to ruin recognizer performance. On the other hand, synthetic data generation should not be restricted so much so that there is insufficient variation to be of any use to a gesture recognizer. Therefore, optimal n is utilized to strike a balance between these objectives. For this reason, optimal n was used throughout the remainder of the evaluations.

B. Evaluation: Recognition Accuracy

The evaluation strategy used herein for recognition accuracy was similar to that used by Wobbrock et al. [Jacob O. Wobbrock et al., 2007]. For a single iteration, given a particular dataset comprised of G gestures and for a specified recognizer, T samples are randomly selected per gesture for training without replacement. One remaining sample per gesture is selected for testing, which results in G recognition tests. These G results are averaged together into a single recognition error rate. This procedure is repeated 1000 times, which thereafter is averaged into a final error rate. Further, for each level of T∈[Lisa Anthony and Jacob O. Wobbrock, 2010; Javier Cano et al., 2002], there are S synthetic gestures generated per real gesture, which are used for training. The levels of S are {8, 16, 32, 64}. All datasets appearing in Table 1 except LP Training were utilized for the main evaluation, due to these familiar datasets commonly appearing in the literature.

Figure 6A:
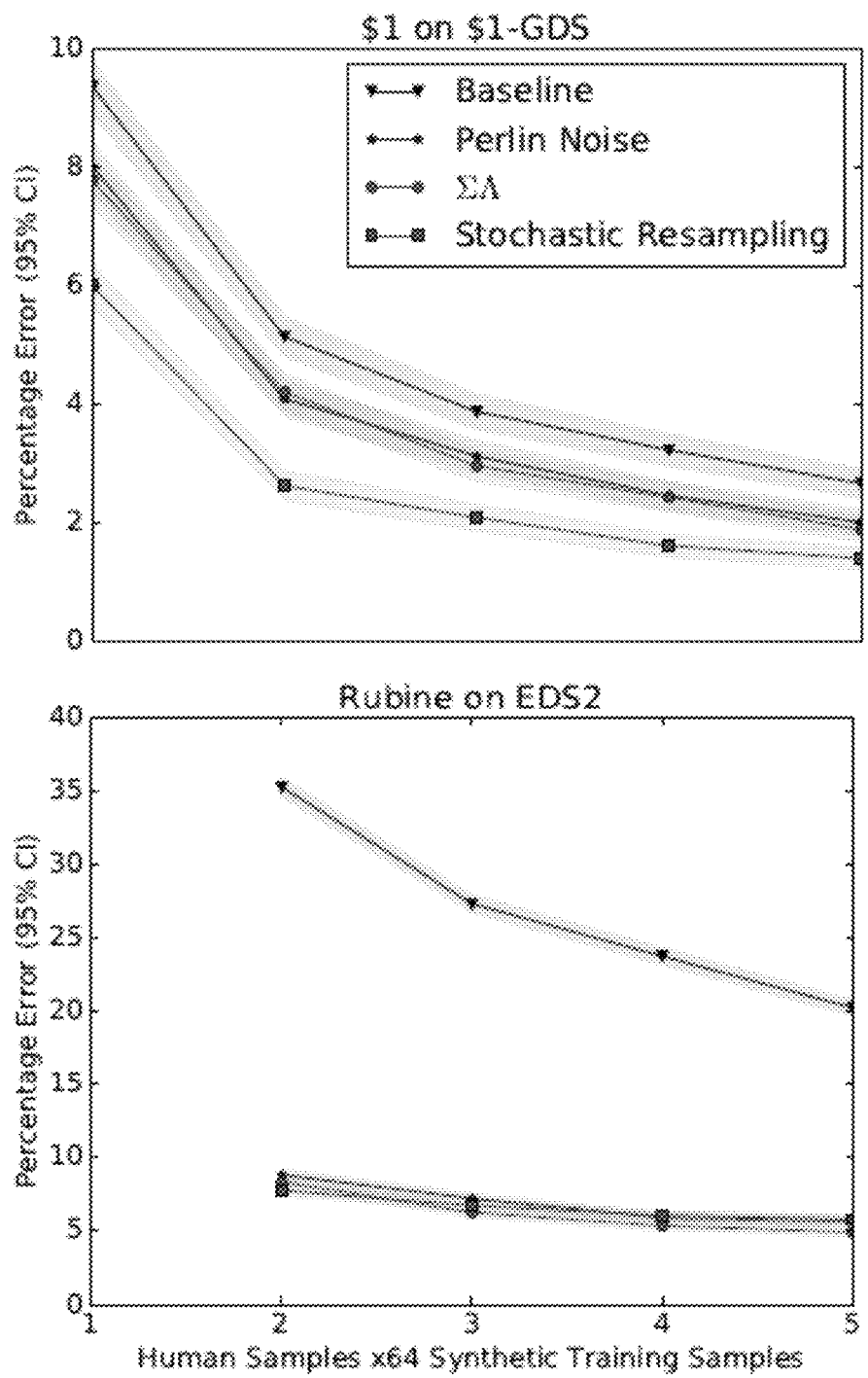
FIGS. 6A-6C depict accuracy results for various configurations. In each graph, the horizontal axis is the number of human samples per gesture used for training, where S=64 synthetic samples were created per real sample. Results were randomly selected so as not to highlight any one particular recognizer and dataset. However, across the board, one will notice that mean recognition errors are significantly reduced using SR with gestures being stochastically resampled to optimal n.
Figure 6B:
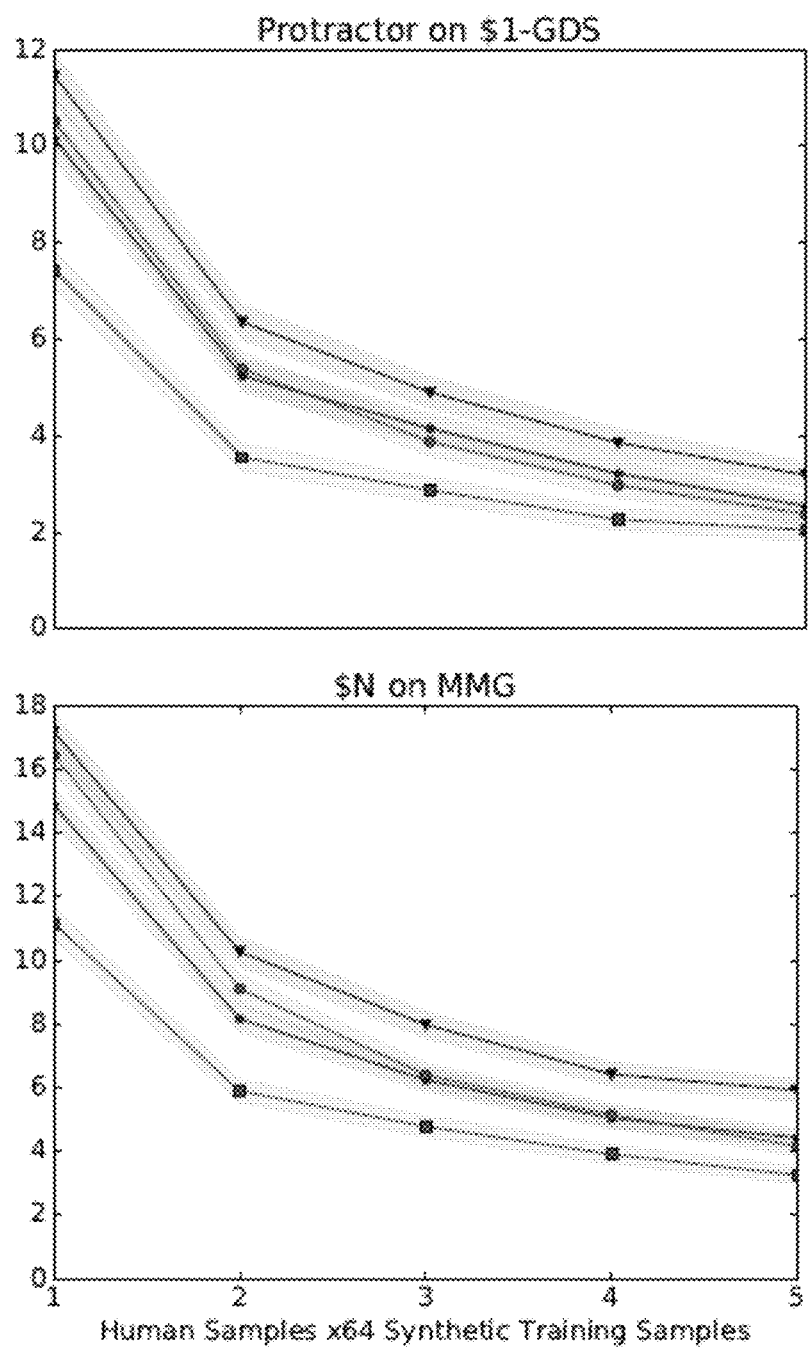
Figure 6C:
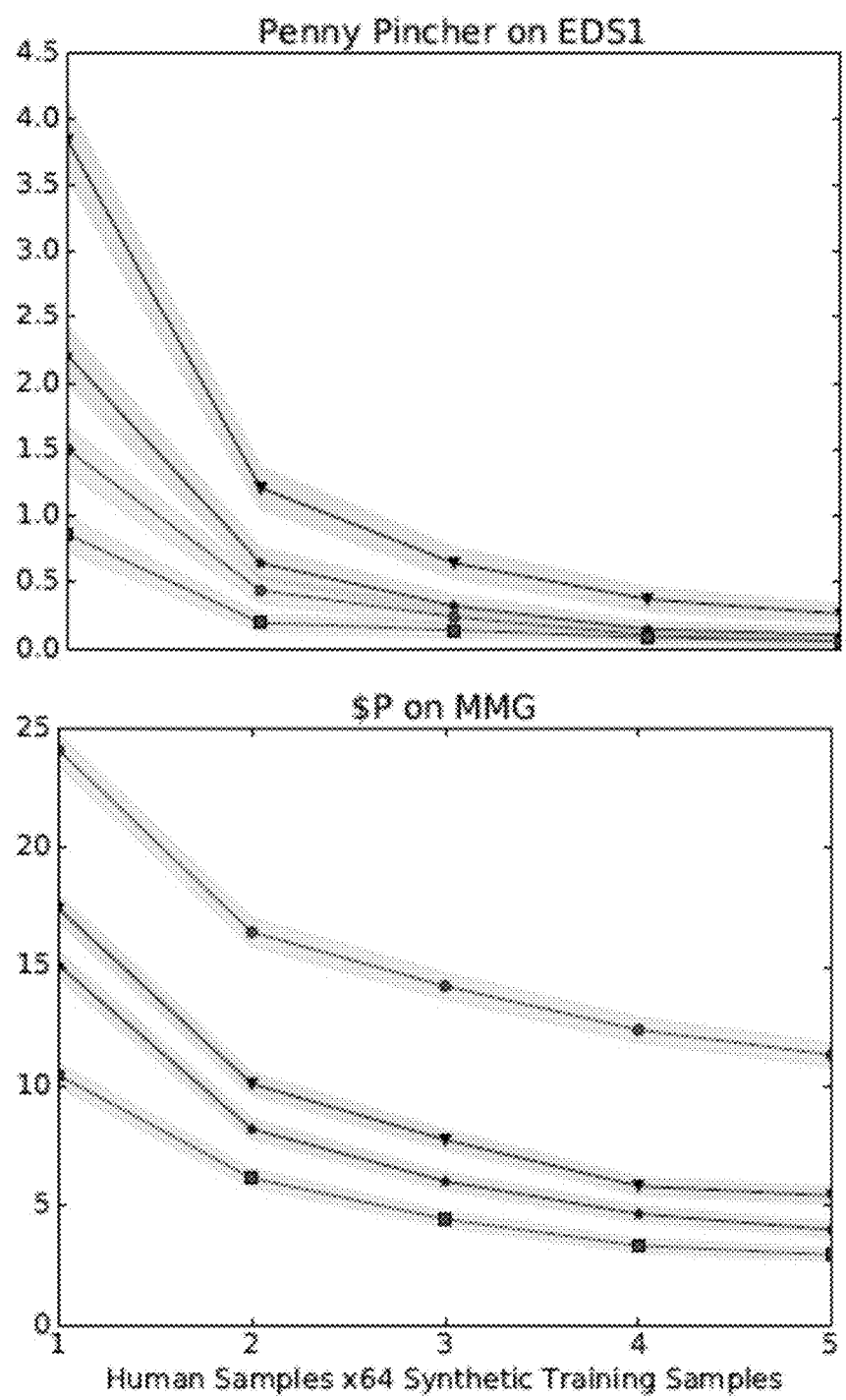

Recognition accuracy when only one or two samples are given per gesture was a focus, which is why the formal analysis was restricted to T∈[Lisa Anthony and Jacob O. Wobbrock, 2010; Lisa Anthony and Jacob O. Wobbrock, 2012]; the remaining levels are used only to show that the trends continue as T increases, as is shown in FIGS. 6A-6C. Further, the tests were writer independent because the primary objective was improving general recognition performance. As a last note, since error rates tend to be skewed towards zero and violate ANOVA assumptions, the Aligned Rank Transform (ART) method [Jacob O. Wobbrock, Leah Findlater, Darren Gergle, and James J. Higgins. 2011. The Aligned Rank Transform for Nonparametric Factorial Analyses Using Only Anova Procedures. In Proceedings of the SIGCHI Conference on Human Factors in Computing Systems (CHI '11). ACM, New York, N.Y., USA, 143-146] was used to carry out the analysis.

i. Evaluation of SDG Methods

In addition to running all recognizers without synthetic data generation (the baseline), three SDG methods were evaluated: SR, Perlin noise, and ΣΛ. SR was implemented as discussed where samples are stochastically resampled according optimal n (Equation 11). The Perlin noise implementation developed for [Kenny Davila et al., 2014] was also used. This implementation includes several parameters that influence the shape of the generated synthetic sample (such as map resolution, amount of noise, etc.). Suitable values for these parameters were established via contact with the authors. Moreover, the authors expressed that the noise map was further smoothed via Gaussian blur prior to application, and these considerations were incorporated in this implementation. It should be noted that Perlin noise map generation is time consuming, which makes synthetic sample generation slow as compared to SR or ΣΛ (post parameter extraction). To reduce the time needed to run the experiments, 2048 Perlin noise maps were precomputed and cached to disk prior to application. Although considerable speed improvements were observed, these cached maps required 64 MiB of storage space.

This ΣΛ implementation is based on the recent parameter extraction algorithms described by Martín-Albo et al. [D. Martín-Albo et al., 2015]. Since parameter extraction can also be a time-consuming process, the ΣΛ models were first extracted for all samples in the aforementioned datasets and used only sufficiently high quality models in the evaluation. That is, per [Luis A. Leiva et al., 2015], the signal-to-noise ratio of a reconstructed model was required to be 15 dB or greater; otherwise the sample was excluded. Since the success of parameter extraction is dependent on signal quality, low resolution strokes can lead to difficult situations. An example of a problematic scenario occurs with the MMG dataset [Lisa Anthony and Jacob O. Wobbrock, 2010] where multiple points have the same timestamp, which causes an incorrect velocity calculation.

ii. Recognizers a. Template Matching Recognizers

Since SR is designed to be used as a rapid prototyping technique, it is expected that $-family recognizers and other similarly related rapid prototyping gesture recognizers can be paired with the SR method. Therefore, SR was evaluated with six such recognizers: $1 [Jacob O. Wobbrock et al., 2007], Protractor [Yang Li. 2010. Protractor: A Fast and Accurate Gesture Recognizer. In Proceedings of the SIGCHI Conference on Human Factors in Computing Systems (CHI '10). ACM, New York, N.Y., USA, 2169-2172], $N [Lisa Anthony and Jacob O. Wobbrock, 2010], $N-protractor [Lisa Anthony and Jacob O. Wobbrock, 2012], $P [Radu-Daniel Vatavu, et al., 2012], and Penny Pincher [Eugene M. Taranta II et al., 2016]. An additional benefit is that a variety of distance metrics are used throughout this suite of recognizers, so although these methods are all template matching, a large variety of techniques are represented.

b. Parametric Recognizers

Two parametric recognizers, Rubine's linear classifier [Dean Rubine. 1991. Specifying Gestures by Example. SIGGRAPH Computer Graphics 25, 4 (July 1991), 329-337] and naive Bayes were implemented and trained using the same set of features. It was found that the original set of 13 features in [Id.] were inadequate for writer independent gesture recognition, and some features were unusable, since SR does simulate timestamps for example. To overcome these issues, some of the most prominent features described in [Rachel Blagojevic et al., 2010] were included. The final features used were the cosine ([Dean Rubine, 1991]:1) and the sine ([Id.]:2) of the initial angle, angle of the bounding box's diagonal ([Id.]:4), the distance between the endpoints ([Id.]:5), cosine ([Id.]:6) and the sine ([Id.]:7) of the angle between the first and the last point, aspect ([Rachel Blagojevic et al., 2010]:7-2), total angle traversed ([Dean Rubine, 1991]:9) as well as some convex hull related features such as length:perimeter ratio ([Rachel Blagojevic et al., 2010]:2-6), perimeter efficiency ([Id.]:7-16) and perimeter:area ([Id.]:7-17) ratio.

iii. Recognition Errors (Accuracy)

FIGS. 6A-6C show results for various recognizers on different datasets. These results were selected so as not to highlight any particular recognizer, dataset, or SDG method, though the results are consistent across all tested scenarios. One exception is naive Bayes, which will be discussed below. Further, it can be seen that that ΣΛ performance is below baseline performance on the $P MMG dataset, but this result is compatible with those reported in [Luis A. Leiva et al., 2015]. Table 3 provides detailed recognition error rates for the best performing recognizer for each dataset given one real training sample per gesture. In all cases, SR achieved the best performance.

Minimally with 8 synthetic samples per training sample loaded, SR reduces the error rate by 18% on MMG and 30% on $1-GDS, and with the other two datasets, improvements approached 50%. At 64 synthetic samples per gesture, $P on MMG resulted in a 40% improvement, and $1 on EDS 1 resulted in a 79% reduction in the error rate. ΣΛ and Perlin noise also saw improvements, but to lesser extent as can be seen in the table. Since a vast number of tests were run, in what follows, average results across all recognizers and datasets are illustrated herein. It can be seen that SR is a straightforward generalization of uniform resampling, i.e., with $\sigma^2=0$, x=0, and the multistroke extension utilizes concepts from $N [Lisa Anthony and Jacob O. Wobbrock, 2010] and $P [Radu-Daniel Vatavu et al., 2012] without being more complex than either.

TABLE 3

Recognizer percentage error rates (SD) and their associated percentage error rate reductions from baseline (without SDG) given one real training sample per gesture (T = 1), comparing stochastic resampling (SR), ΣΛ and Perlin noise (PN) for S = 8 synthetic samples per real gesture and S = 64 across four datasets. The gesture recognizer shown is the one that achieved the lowest error rate for the given data set and S. In all cases, SR achieved the best performance.

| | $1-GDS | | | | EDS 1 | | | |
| | Pincher, S = 8 | | Pincher, S = 64 | | $1, S = 8 | | $1, S = 64 | |
| | M % (SD) | ± % | M % (SD) | ± % | M % (SD) | ± % | M % (SD) | ± % |
| --- | --- | --- | --- | --- | --- | --- | --- | --- |
| None | 8.59 (6.56) | — | 8.59 (6.56) | — | 2.16 (3.29) | — | 2.16 (3.29) | — |
| SR | 6.05 (5.61) | 30 | 4.76 (5.08) | 45 | 1.11 (2.39) | 49 | 0.46 (1.60) | 79 |

TABLE 3-continued

Recognizer percentage error rates (SD) and their associated percentage error rate reductions from baseline (without SDG) given one real training sample per gesture (T = 1), comparing stochastic resampling (SR), ΣΛ and Perlin noise (PN) for S = 8 synthetic samples per real gesture and S = 64 across four datasets. The gesture recognizer shown is the one that achieved the lowest error rate for the given data set and S. In all cases, SR achieved the best performance.

| | | | | | | | | |
|---|---|---|---|---|---|---|---|---|
| ΣA | 7.32 (5.98) | 15 | 6.41 (5.71) | 25 | 1.92 (3.21) | 11 | 1.38 (2.78) | 36 |
| PN | 7.34 (6.27) | 15 | 6.89 (6.02) | 20 | 1.67 (2.96) | 22 | 1.31 (2.64) | 39 |

| | EDS 2 | | | | MMG | | | |
|---|---|---|---|---|---|---|---|---|
| | Pincher, S = 8 | | Pincher, S = 64 | | $P, S = 8 | | $P, S = 64 | |
| | M% (SD) | ± % | M % (SD) | ± % | M % (SD) | ± % | M % (SD) | ± % |
| None | 2.13 (3.09) | — | 2.13 (3.09) | — | 17.4 (9.20) | — | 17.4 (9.20) | — |
| SR | 1.11 (2.33) | 48 | 0.59 (1.64) | 72 | 14.3 (8.29) | 18 | 10.5 (7.54) | 40 |
| ΣA | 1.37 (2.56) | 36 | 0.92 (2.10) | 57 | 26.6 (9.96) | −49 | 24.1 (9.59) | −38 |
| PN | 1.58 (2.67) | 26 | 1.24 (2.39) | 42 | 15.0 (8.79) | 09 | 15.1 (8.79) | 14 | iv. Template Matching Gesture Recognizers a. Unistroke Gestures

Compared to the baseline percentage error (M=5.49, SD=4.03), without SDG, all methods showed an improvement in accuracy. SR achieved the lowest error (M=3.10, SD=3.04), which was followed by ΣΛ (M=4.33, SD=3.72) and Perlin Noise (M=4.32, S SD=3.51). These differences were statistically significant (F(3, 464)=8.05, p<0.0001), and a post hoc analysis using Tukey's HSD indicated that SR is significantly different from all other methods (p<0.005), although baseline, ΣΛ, and Perlin noise were not significantly different from each other.

b. Multistroke Gestures

With the MMG [Lisa Anthony and Jacob O. Wobbrock, 2012] dataset, results were similar. SR (M=10.10, SD=3.29) achieved the highest performance compared to baseline (M=14.67, SD=4.42), followed by Perlin noise (M=12.68, SD=3.86) and ΣΛ (M=16.98, SD=5.25). Again, these differences were significant (F(3, 74)=11.25, p<0.0001), and the post hoc analysis showed that all SDG methods were significantly different from the baseline (p<0.0002). However, the conventional SDG methods were not significantly different from one another. SR was significantly different from the baseline (p<0.04), and Perlin noise and ΣΛ were not significantly different from the baseline.

v. Parametric Gesture Recognizers

Both parametric recognizers were substantially improved by all SDG methods. The best performing method was Perlin noise (M=13.27, SD=6.52), which was very closely followed by SR (M=13.75, SD=6.10). ΣΛ (M=15.57, SD=7.01) was also well below the baseline (M=32.96, SD=9.47). These results were statistically significant (F (3, 152)=10.998, p<0.0001). Only SR was significantly different from the baseline (p<0.0001).

Upon further analysis, it was found that with Rubine, SR achieved the lowest mean error (M=11.46, SD=5.18), followed by Perlin Noise (M=13.42, SD=5.85). Conversely, with naive Bayes, Perlin noise achieved the lowest mean error (M=13.12, SD=7.25), followed by SR (M=16.04, SD=6.18). Naive Bayes appears to be the only case where Perlin noise achieved a better result than SR.

C. Evaluation: Synthetic Gesture Realism

An objective of this user study was to evaluate the effect of three synthetic data generation methods on the perception of gesture realism. Images were rendered using the various SDG techniques and shown to study participants who, per sample, indicated via a slider bar how confident they were that the image was drawn by a human or was synthetically generated by a computer. Full confidence that an image was human drawn mapped to −1, whereas full confidence that an image was computer synthesized mapped to +1, and responses near 0 indicated uncertainty. In order for an SDG method to achieve a high level of realism, it is expected that the control group and SDG method will have similar responses.

The study comprised a number of factors. Intuitively, the primary four-level factor of interest was the SDG method: none (control group), Perlin noise [Kenny Davila et al., 2014], ΣΛ [Réjean Plamondon and Moussa Djioua, 2006], and SR. Stroke count was a second factor, being either unistroke or multistroke. However, the current inventors intentionally avoided rendering every image identically by introducing four additional two-level factors. These factors were selected simply to increase variability of the rendered images and to help ensure robustness of the final results. Since Gaussian smoothing was applied to each stroke before rendering an image, standard deviation $\sigma \in \{1, 2\}$ was included as a factor, as well as kernel width (±3 or ±6 points) as another factor. Before applying this filter, strokes were also uniformly resampled to 32 or 64 points. The last factor utilized was image size, which was either 64×64 or 128×128 pixels. Therefore, in total there were $2^5 \times 4 = 128$ treatments. To help control cost and response variability, a within-subjects design was run.

Figure 7:
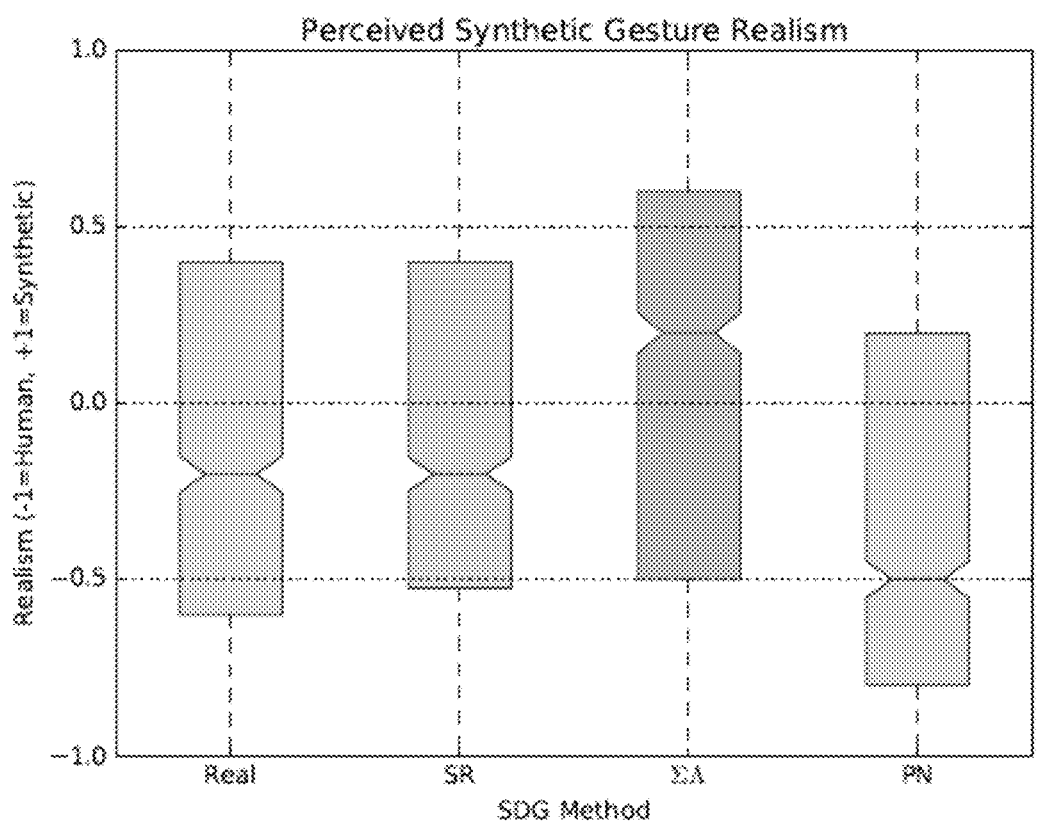
FIG. 7 depicts perception of SR, Perlin noise (PN), and ΣΛ synthetic gesture realism, compared to real human drawn samples.

Treatments were limited to 64 per participant using a $2^{5-1}4$ resolution V fractional factorial design [C. F. Wu and Michael S. Hamada. 2009. Experiments: Planning, Analysis, and Optimization. Wiley], which was folded over between-subjects to maintain a full factorial resolution (this approach differs slightly from a mixed design where at least one factor is a between-subjects variable). Using AMAZON MECHANICAL TURK, 58 participants (36 male, 21 female, 1 undeclared) were recruited, with an average age of 32.9 years (SD=8.7). Participants were presented their 64 treatments in random order. The results of this study are shown in FIG. 7.

After collecting the user study data, a 5-factor ANOVA was run to determine if participants' perception of realism differed along any of the previously defined factors. Significant differences were found between SDG methods ($F_{3,28}$=56.38, $p<0.0005$), smoothing sigma ($F_{1,28}$=12.23, $p<0.0005$), and stroke count (F1,28=9.32, $p<0.005$). However, there were no significant interaction effects. Post hoc analysis using Tukey's HSD found that there was no difference in confidence (p=0.958) between stochastic resampling (M=−0.10, σ=0.58) and actual human drawn treatments (M=−0.12, SD=0.59). However, there were significant differences between the remaining pairs, with the largest ($p<0.0005$) being between Perlin noise (M=−0.28, SD=0.59) and ΣΛ (M=0.07, SD=0.60). Recalling that −1 indicated full confidence that a sample was drawn by human, Perlin noise appeared to be the most realistic, SR and real samples were closer to uncertainty (being only 0.02 apart), whereas ΣΛ appeared to be the most unrealistic.

The direction of the difference between Perlin noise and ΣΛ did not line up with expectations given the appearance of the samples that were generated during testing. A follow up study was run with the same factors, but limited the SDG methods factor to just Perlin noise and ΣΛ. For this study, participants were asked to write down why they selected their confidence value in a text box at the bottom of each page. 16 participants were recruited for the follow up study. Results were consistent with the first study, though of more importance was the qualitative data received from the participants regarding why a specific value was given. Users stated that Perlin samples appeared to be human drawn because they were "bumpy", "shaky", and "wobbly"—all words that describe the artifacts that appear when applying the Perlin noise filter. Conversely, ΣΛ was seen to be more synthetic because "lines were too straight", curves were too perfect, and the placement of strokes was too accurate. It would seem, based on these comments, that the imperfections in synthetic generation are more likely to be perceived as human error by a user.

Of the four methods evaluated, Perlin noise appeared to be the most realistic and ΣΛ the most synthetic. However, on average, participants were unable to distinguish real samples from SR-generated samples, which suggests that SR, more than the alternative methods, is able to generate a distribution of samples that are representative of the real population.

D. Evaluation: Runtime Performance

To determine the average time required to generate one synthetic sample, additional tests were run specifically to measure synthetic gesture generation speed with $1-GDS and MMG data sets. The performance of Perlin noise was evaluated both with and without using cached maps. The tests were performed on a SURFACE PRO 3 featuring a low-power dual core INTEL CORE-i7 mobile processor running at 2.30 GHz and 8 GiB of RAM. Table 4 summarizes the results.

TABLE 4

Average time required to generate one synthetic sample by each SDG method. All values are reported in microseconds and are averaged over 256000 trials. Perlin[†] set is performed using cached Perlin maps, and the ΣΛ time does not include parameter extraction, which can take several seconds.

|  | $1-GDS | | MMG | |
| --- | --- | --- | --- | --- |
|  | M (μs) | SD | M (μs) | SD |
| SR | 6.75 | 0.43 | 8.34 | 0.45 |
| ΣΛ | 125.46 | 14.96 | 129.32 | 12.09 |
| Perlin | 1101.16 | 79.43 | 1091.89 | 30.31 |
| Perlin[†] | 6.82 | 0.49 | 7.38 | 0.64 |

According to Table 4, the only method that is marginally faster than SR is cached Perlin noise. However, this superiority comes at the cost of additional storage needs. As mentioned before, caching 2048 Perlin noise maps requires 64 MiB of storage which may constrain its use on devices where available memory for applications is limited to a few hundred megabytes. Without caching, Perlin noise was the slowest method tested. Further, it is evident that all methods performed slightly worse on generating synthetic multistroke samples, which coincides with expectations. It can be seen that SR does result in a low computational cost, which is suitable for rapid prototyping. The current approach can be used in real-time to generate potentially hundreds of synthetic samples.

Example 2

Figure 8:
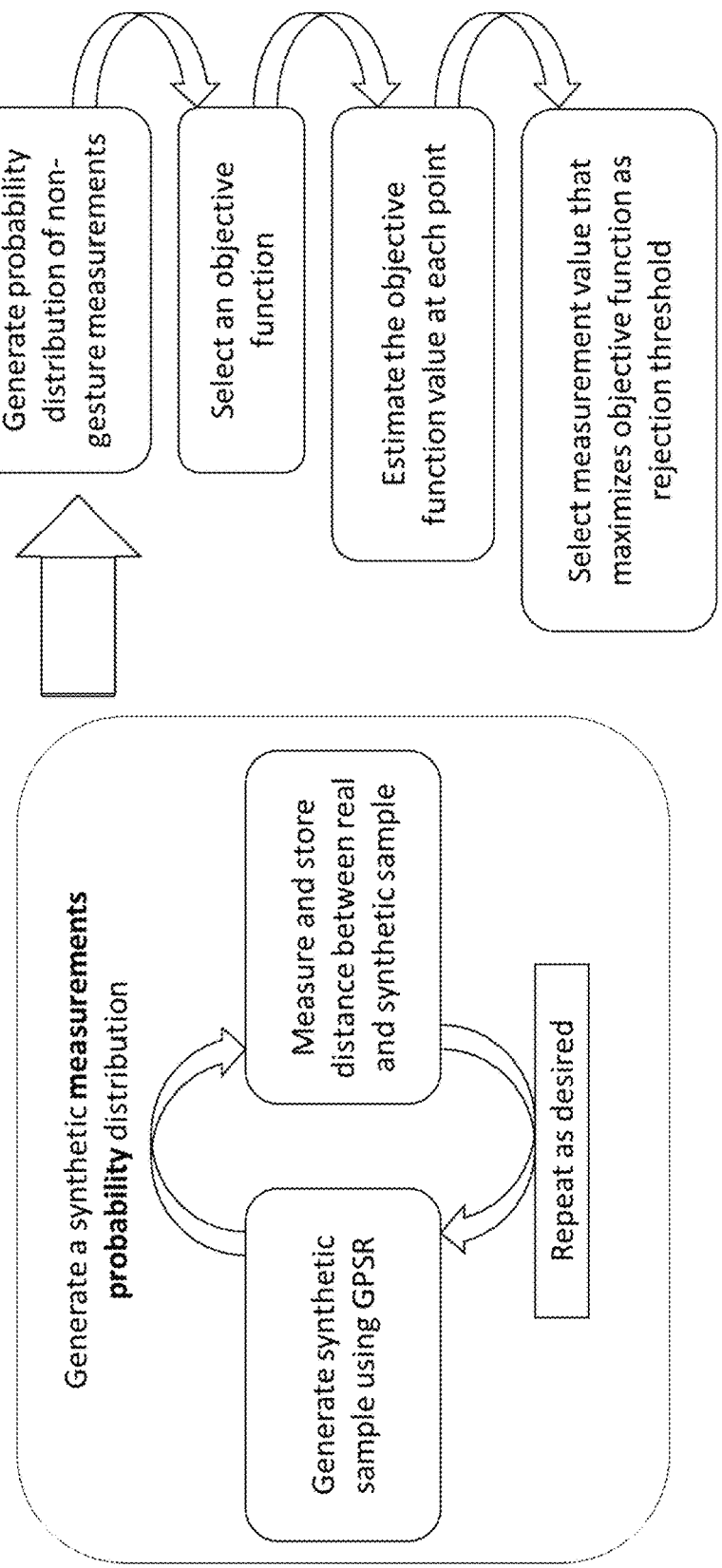
FIG. 8 is a flowchart depicting a step-by-step process of establishing a rejection threshold.

Gesture path SR (GPSR) is used herein as part of a process to find an appropriate rejection threshold for gesture spotting, for example in a continuous data stream, such as a video. The GPSR technique has been described herein and is now being applied to establish a rejection threshold. Generally, the rejection threshold is the value at which similarity between previous gestures and a new gesture determines whether the user actually performed the gesture. If similarity is sufficiently high, then the gesture is considered performed and the sample is accepted; if similarity is not sufficiently high, then the gesture is considered not performed and the sample is rejected. Determining this rejection threshold without a large sample set is difficult, which is why the previously-discussed SR method is used to create a synthetic distribution. See FIG. 8. Synthetic samples are repeatedly compared to new samples to obtain a distribution of scores that provide an indication as to how future samples/gestures may appear (positive samples). Another distribution of scores is also created to indicate what is not the gesture (negative samples). Once both distributions are generated, an overlap may exist between the distributions. A point is taken between the distributions to minimize the overlap and obtain the best score possible, thus maximizing probability of having effective rejection criteria. These concepts will become clearer as this specification continues.

Figure 9:
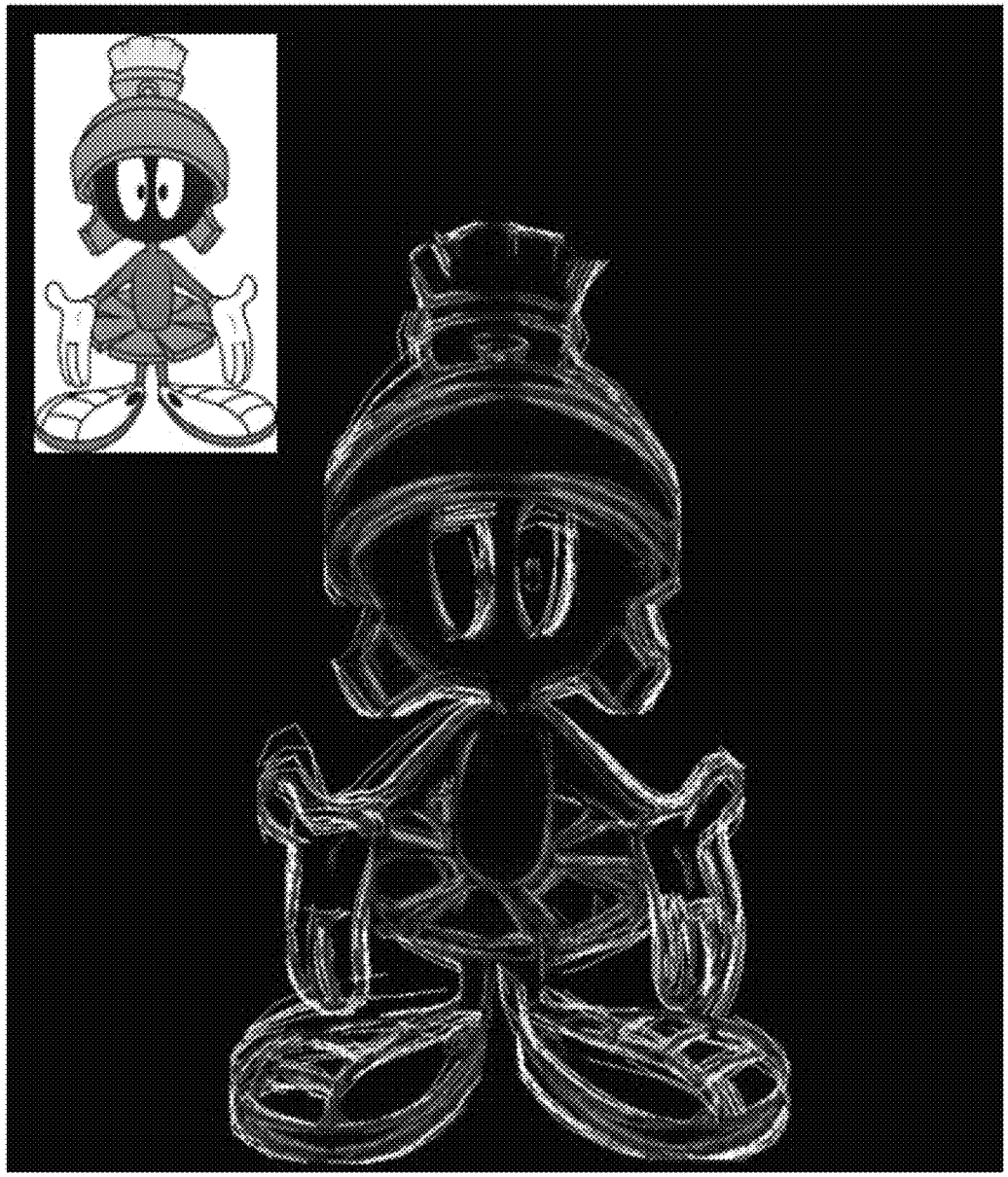
FIG. 9 is an image generated using SR to perform "sketchification."

Whereas the previous discussions relate to two-dimensional pen and touch data, higher dimensional data (e.g., 63D KINECT and LEAP MOTION skeleton data) will now be considered and discussed. FIG. 9 is a picture generated by certain embodiments of the current invention, using SR to perform "sketchification." Edges are first detected in the original image (upper left), after which each edge is converted into a pen stroke. Next, each stroke is stochastically resampled and redrawn multiple times to create the artistic sketchy effect. Aside from static images, one can apply SR in real-time to create a sketchy rendering effect for animations and video games. In another application, any picture can be applied with SR to create a non-photorealistic image of that picture. This can be implemented in a mobile software application, for example.

To begin addressing the issues described previously with regards to using recognizers with continuous data streams, a general recognizer was developed herein for dynamic gestures that, much like a multitool, is a collection of techniques designed to handle various scenarios. This recognizer is designed to be modality-agnostic, so that little domain specific knowledge is required, and competitive accuracy can be achieved with minimum training data. At the heart of the recognizer developed herein is DTW, an elastic dissimilarity measure suitable for handling large gesticulation variability. DTW has repeatedly been shown to be a high-quality recognizer in time series research, especially for nearest neighbor (NN) pattern matching, though DTW itself was not designed explicitly for gesture recognition.

Discussing DTW further, gestures are naturally represented as time series, and it is known that DTW is an excellent measure for 1-nearest nearest (1-NN) pattern recognition in times series classification problems. As an example of its power, Giusti and Batista [Rafael Giusti and Gustavo E. A. P. A. Batista. 2013. An Empirical Comparison of Dissimilarity Measures for Time Series Classification. In Proceedings of the 2013 Brazilian Conference on Intelligent Systems (BRACIS '13). IEEE Computer Society, Washington, D.C., USA, 82-88] compared 48 dissimilarity measures over 42 time series datasets and found that DTW and CIDDTW [Gustavo E. A. P. A. Batista, Xiaoyue Wang, and Eamonn J. Keogh. 2011. A Complexity-Invariant Distance Measure for Time Series. Chapter 60, 699-710] are among the top performing measures on average. More recently, Bagnall et al. [Anthony Bagnall, Aaron Bostrom, James Large, and Jason Lines. 2016. The Great Time Series Classification Bake Off: An Experimental Evaluation of Recently Proposed Algorithms. Extended Version. arXiv preprint arXiv:1602.01711 (2016)] conducted an extensive evaluation of 18 recently proposed state-of-the-art classifiers over 85 datasets and found that many of the approaches do not actually outperform 1-NN DTW or Rotation Forest, and they also remark that DTW is a good base to compare against new work.

DTW has also already been used quite successfully in gesture recognition. Celebi et al. [Sait Celebi, Ali Selman Aydin, Talha Tarik Temiz, and Tarik Arici. 2013. Gesture Recognition using Skeleton Data with Weighted Dynamic Time Warping. In VISAPP (1). 620-625] implemented weighted DTW for KINECT to recognize 8 gestures with 28 samples per gesture. They weighted each skeleton joint differently by optimizing a discriminant ratio. Wu et al. [J. Wu, J. Konrad, and P. Ishwar. 2013. Dynamic time warping for gesture-based user identification and authentication with KINECT. In 2013 IEEE International Conference on Acoustics, Speech and Signal Processing. 2371-2375] utilized DTW for user identification and authentication on KINECT. Their dataset consisted of 8 unique gestures, each repeated 5 times, collected from 20 individuals. Bodiroza et al. [Saša Bodiroža, Guillaume Doisy, and Verena Vanessa Hafner. 2013. Position-invariant, Real-time Gesture Recognition Based on Dynamic Time Warping. In Proceedings of the 8th ACM/IEEE International Conference on Human-robot Interaction (HRI '13). IEEE Press, Piscataway, N.J., USA, 87-88] used DTW on KINECT data to recognize 6 hand gestures performed 20 times by a single subject. Vikram et al. [Sharad Vikram, Lei Li, and Stuart Russell. 2013. Writing and Sketching in the Air, Recognizing and Controlling on the Fly. In CHI '13 Extended Abstracts on Human Factors in Computing Systems (CHI EA '13). ACM, New York, N.Y., USA, 1179-1184] developed a DTW-based recognizer for the LEAP MOTION sensor to recognize hand writing in the air. Their dataset consisted of both uppercase and lowercase alphabetical letters, and each letter was repeated 5 times by 100 participants. Not only is it seen again that a large number of training samples are used, but these works also mostly utilize Euclidean distance as the local cost function for DTW. In this approach, the inner product of gesture path direction vectors is emphasized, and it is shown that this local cost function usually achieves higher accuracy.

However, DTW is infamous for its sluggishness, which may be an unfair assessment. In its classic form, DTW is quadratic, although Rakthanmanon et al. [Thanawin Rakthanmanon, Bilson Campana, Abdullah Mueen, Gustavo Batista, Brandon Westover, Qiang Zhu, Jesin Zakaria, and Eamonn Keogh. 2012. Searching and mining trillions of time series subsequences under dynamic time warping. In Proceedings of the 18th ACM SIGKDD international conference on Knowledge discovery and data mining. ACM, 262-270] demonstrated that DTW can be optimized to achieve search times faster than typical linear time Euclidean distance search algorithms. Further, even without optimizations, Vatavu [Radu-Daniel Vatavu. 2011. The Effect of Sampling Rate on the Performance of Template-based Gesture Recognizers. In Proceedings of the 13th International Conference on Multimodal Interfaces (ICMI '11). ACM, New York, N.Y., USA, 271-278] found that low sampling rates achieve high accuracy for Euclidean distance, angular, and DTW based 2D gesture recognizers. Here, gestures are resampled to n=16 points, and by using a Sakoe-Chiba Band [Hiroaki Sakoe and Seibi Chiba. 1978. Dynamic programming algorithm optimization for spoken word recognition. IEEE transactions on acoustics, speech, and signal processing 26, 1 (1978), 43-49] (i.e., to control pathological warping) that constrains DTW's search window to r=2, complexity drops to $\sigma(rn)$. It is also useful to compare DTW with $P [Radu-Daniel Vatavu et al., 2012], a $\sigma(n^{2.5})$ recognizer. In particular, it is noted that $P is popular and in common use, suggesting that the algorithmic complexity of DTW should not be an issue for many applications.

The objectives herein are to provide a general, device-agnostic dynamic gesture recognizer; demonstrate that DTW is a powerful 1-NN gesture recognizer useful for rapid prototyping and custom gestures; demonstrate that the inner product of gesture path direction vectors is often a better local cost function for DTW as compared to the pervasive squared Euclidean distance, which has not been explicitly evaluated; present new correction factors that modify the DTW score and help disambiguate certain gestures as well as further separate negative samples from positive sample; and introduce a new method to select a per class rejection threshold for gesture spotting in a continuous stream. The current method was evaluated with a new dataset collected from 40 participants.

In an embodiment, the current invention is a multitool for gesture recognition equipped with the following functionalities: dynamic time warping using the inner product of gesture path direction vectors as the local cost function and squared Euclidean distance as a backup, correction factors that inflate the scores of dissimilar gestures, and a synthetic gesture generator for learning a rejection criteria. In practice, individuals would only need to implement the components required for their specific application.

Here, gestures are treated as time series, an ordered set of points $$P = (p_i | i = 1 \ldots n), \quad (12)$$

where n is the number of points in the series and each $p_i \in \mathbb{R}^m$. Typical values of m for various modalities include m=2 for pen or touch, m=21×3 for KINECT 2.0, and m=21×3 for LEAP MOTION. A gesture can also be represented as a set of unit length direction vectors through m-space, which is referred to as the gesture path direction vectors:

$$\vec{P} = \left( \vec{p_i} = \frac{p_{i+1} - p_i}{|p_{i+1} - p_i|} \,\bigg|\, i = 1 \ldots n - 1 \right) \quad (13)$$

Further, a query sequence is denoted as Q and a template sequence as T, where a template is a time series representation of a specific gesture class. The current method employs 1-nearest neighbor classification, where a query is compared against all templates stored in a database, and the template whose measure against the query is least dissimilar is said to match the gesture class of the query. Formally, given a set of templates $\mathbb{T}$ and a query Q, the query's class is the gesture class of $T_i \in \mathbb{T}$ that minimizes their dissimilarity:

$$\text{match} = \underset{T_i \in \mathbb{T}}{\text{argmin}} \prod_{j=1}^{F} f_j(T_i, Q) \quad (14)$$

where $f_1$ is the DTW measure of T and Q, and $f_{2 \le i \le F}$ are correction factors. This approach is based on the complexity-invariant distance (CID) measure [Gustavo E. A. P. A. Batista et al., 2011]. CID inflates a base distance measure, such as Euclidean distance or DTW, with a correction factor (CF) that is a measure of the complexity difference between a template and query. CF ranges from one to positive infinity such that time series similar in "complexity" score near one and the base distance measure remains relatively unchanged. Otherwise, the score is inflated. The interpretation of CID is that a good CF is able to capture information about the dissimilarity of two time series for which the base distance measure is unable, though the CF measure does not necessarily need to relate to notions of complexity.

A. Dynamic Time Warping

Figure 10A:
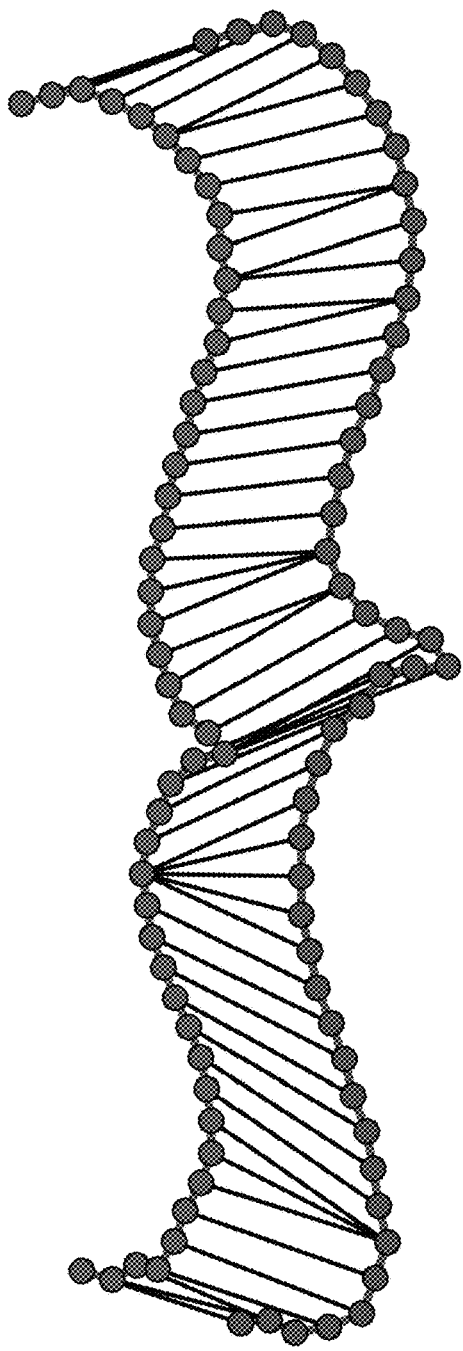
FIG. 10A is a visualization of a 2D alignment found by DTW between two right curly braces, from the $1-GDS dataset.
Figure 10B:
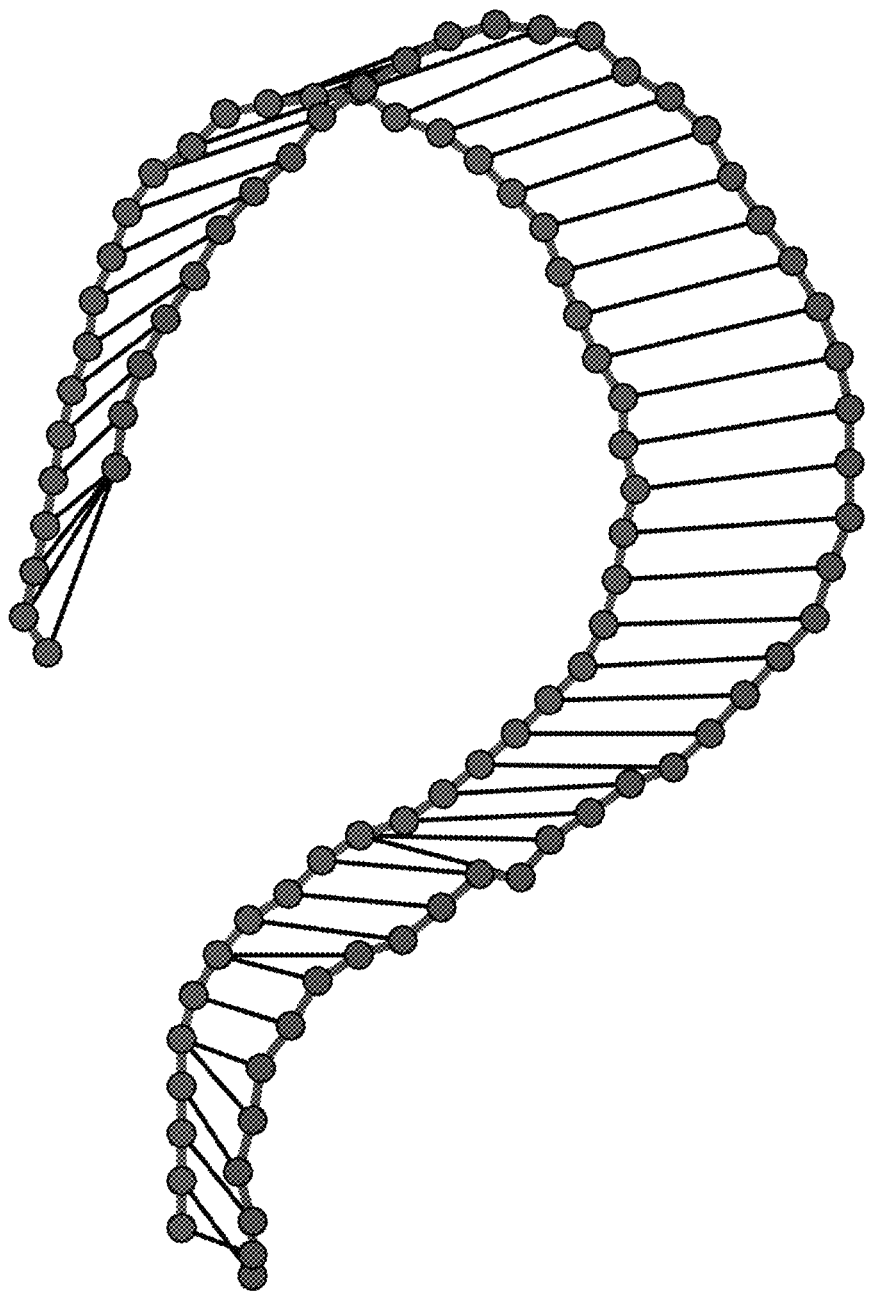
FIG. 10B is a visualization of a 2D alignment found by DTW between two unistroke question marks, from the $1-GDS dataset

DTW is a dissimilarity measure that allows local warping of time series in order to find the best alignment. Given two time series T and Q of length n and m, an n-by-m cost matrix was constructed. Each element (i, j) in the matrix stores the minimum cumulative distance between the subsequences $t_1, \ldots, t_i$ and $q_1, \ldots, q_j$. This cumulative distance can be found efficiently with dynamic programming by solving the following recurrence:

$$\gamma(i, j) = d(t_i, q_j) + \min \begin{cases} \gamma(i-1, j-1) \\ \gamma(i-1, j) \\ \gamma(i, j-1) \end{cases} \quad (15)$$

where $d(t_i, q_j)$ is a local cost function, discussed shortly. In other words, during the evaluation of element (i, j), the cumulative measure of three neighbors are considered, the minimum is taken, and the local cost of matching $t_i$ to $q_j$ is added to the minimum, which then becomes the minimum cumulative distance for the subsequences under evaluation. Once the matrix is fully evaluated, element (n, m) is the DTW score for T and Q. The path through the matrix that defines the minimum cumulative distance between the sequences is the optimal warping path, which is a set of alignments between T and Q. Visualizations of the warping path between two different 2D gestures are shown in FIGS. 10A-10B.

i. Local Cost Function

The local cost function $d(t_i, q_j)$ in Equation 15 is most frequently the squared (or standard) Euclidean distance over z-score normalized sequences (each sequence is z-score normalized independently): $d(t_i, q_j) = (t_i - q_j)^2$. However, it was found in gesture recognition that this cost function is not always the best option. An alternative that has received less attention is the inner product of a feature vector measure [Robert Macrae and Simon Dixon. 2010. Accurate real-time windowed time warping. In in ISMIR, 2010. 423-428], which can also be applied to gestures. Instead of extracting feature vectors from a time series, the gesture path direction vectors (see Equation 13) are utilized. Since the inner product is a similarity measure in [−1, 1] for unit vectors, this is converted to a dissimilarity as follows:

$$d(\vec{t_i}, \vec{q_j}) = 1 - \langle \vec{t_i}, \vec{q_j} \rangle \quad (16)$$

where $1 \le i < n$. This approach is inspired by the 2D Penny Pincher [Eugene M. Taranta II et al., 2016] gesture recognizer that also uses the inner product of direction vectors, an approach that proved to be empirically faster than alternative unistroke recognizers while remaining competitive in accuracy. When used as the local cost function, it will be demonstrated herein that the inner product measure (IP) is often superior to the squared Euclidean distance measure (ED) in gesture recognition problems.

ii. Warping Window Constraint

With classic DTW, pathological warping can occur when a small part of one subsequence is inappropriately mapped to a large portion of another [Chotirat Ann Ratanamahatana and Eamonn Keogh. 2004. Everything you know about dynamic time warping is wrong. In Third Workshop on Mining Temporal and Sequential Data]. To prevent this issue, one can constrain the amount of warping allowed. A popular approach is the Sakoe-Chiba Band [Hiroaki Sakoe and Seibi Chiba, 1978], which limits the maximum distance r the warping path can stray from the diagonal, where $|i-j| \le r$. An additional benefit immediately apparent is that constraining the warping path can significantly speedup DTW as less of the cost matrix is evaluated. The optimal warping window varies per problem [Chotirat Ann Ratanamahatana and Eamonn Keogh, 2004], but a very common constraint is 10% of the time series length, which also yields very good results in the testing.

iii. Lower Bounding DTW

The cost of performing DTW is not much of a concern when working with segmented data at a low resampling rate as well as with a small number of gesture classes and training samples. However, when working with a continuous data stream where DTW evaluations are frequent and observational latencies are problematic, it can be useful to prune templates that will obviously not match a query. An efficient lower bound (LB) score, where $LB(T, Q) \le DTW(T, Q)$, can be used to avoid a full evaluation in two cases: when the determined lower bound is worse than a predetermined rejection threshold or when a closer match has already been found. One such lower bound for DTW using ED is $LB_{Keogh}$ [Eamonn Keogh and Chotirat Ann Ratanamahatana. 2005. Exact indexing of dynamic time warping. Knowledge and information systems 7, 3 (2005), 358-386], which envelopes a time series T with an upper (U) and lower (L) band based on a window constraint r:

$$U = \left(u_i = \max_{i-r \leq i \leq i+r} t_i\right) L = \left(l_i = \min_{i-r \leq i \leq i+r} t_i\right). \quad (17)$$

Figure 11A:
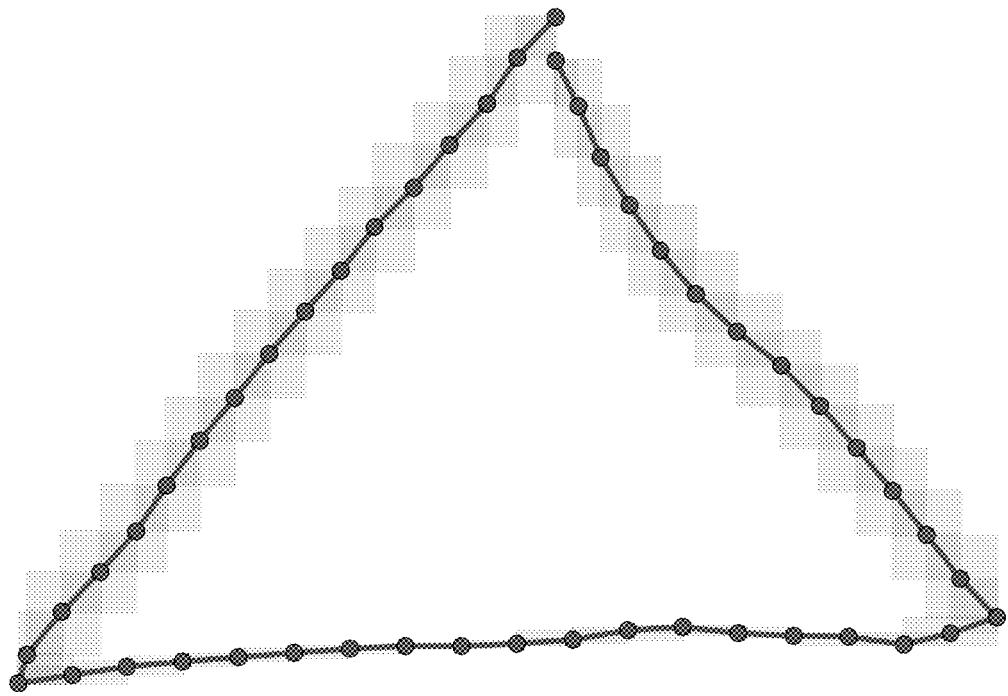
FIG. 11A is a visualization of a $LB_{Keogh}$ lower bound in 2D for the triangle gesture from $1-GDS. The combined upper and lower bands of a template form a shaded bounding box per point, as can be seen in the figure.
Figure 11B:
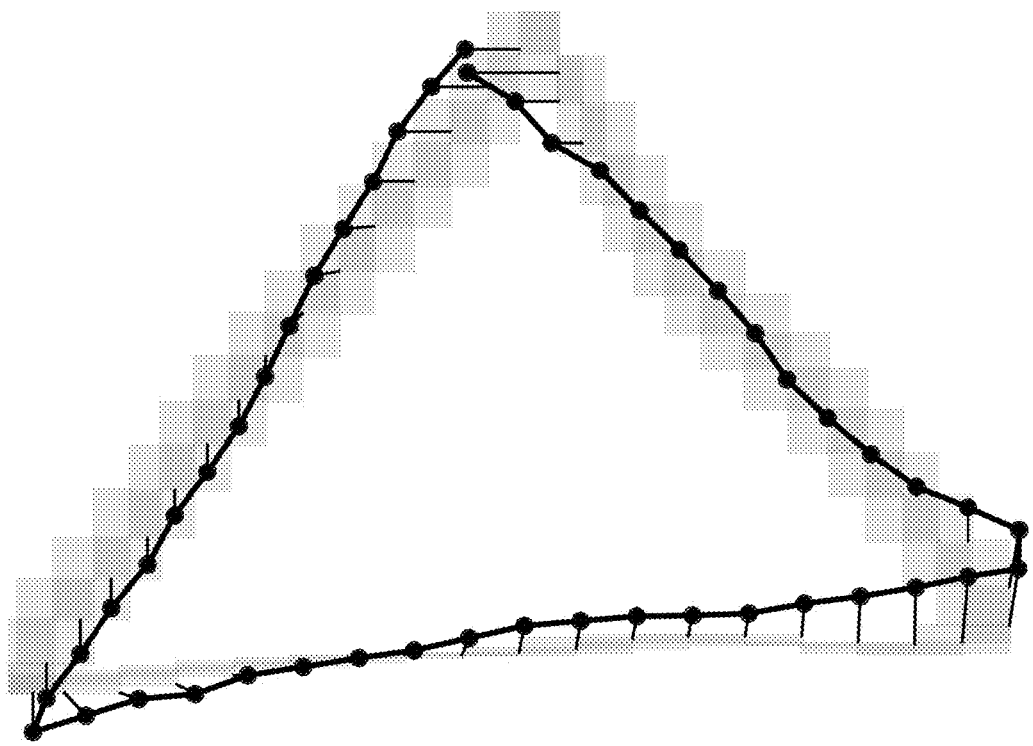
FIG. 11B is a visualization of a $LB_{Keogh}$ lower bound in 2D for the triangle gesture from $1-GDS. The $LB_{Keogh}$ lower bound is calculated for a query as the sum of the minimum squared Euclidean distance from each point in Q to the corresponding point boundary from T (shown as thin black lines).

Note that $\forall_i L_i \leq T_i \leq U_i$. To lower bound a query Q against a template T for DTW using ED, the following is defined:

$$LB_{Keogh}(T, Q) = \sum_{i=1}^{n} \begin{cases} (q_i - U_i)^2 & \text{if } q_i > U_i \\ (q_i - L_i)^2 & \text{if } q_i < L_i \\ 0 & \text{otherwise} \end{cases} \quad (18)$$

which are visualized in FIGS. 11A-11B.

A lower bound has also been derived for the inner product of posteriorgrams [Yaodong Zhang and James R Glass. 2011. An inner-product lower-bound estimate for dynamic time warping. In 2011 IEEE International Conference on Acoustics, Speech and Signal Processing (ICASSP). IEEE, 5660-5663] based on the local cost function $d(t_i, q_j) = -\log \langle t_i, q_j \rangle$. One issue with this inner product lower bound is that each component in a posteriorgram is non-negative, which is unlike gesture path direction vectors whose components can take on negative values, and hence a different lower bound is required. The inner product lower bound is similar to $LB_{Keogh}$, where the upper and lower bands are calculated in the same way. However, the summation instead is based on the IP distance. If a component in the query vector is positive, then its similarity will be maximized when paired with the upper band component (if both signs are positive), but the dissimilarity is also minimized when paired with the upper band (if the signs are opposite). For the same reasons, if a component in a query vector is negative, pairing with the lower band will produce the best possible result, which leads to the following IP lower bound:

$$LB_{IP}(T, Q) = \sum_{i=1}^{n} 1 - \min[1, \max(-1, \langle lb_i, q_i \rangle)] \quad (19)$$

$$lb_i^j = \begin{cases} U_i^j & \text{if } q_i^j j \geq 0 \\ L_i^j & \text{otherwise} \end{cases},$$

where j indexes a vector's components ($1 \leq j \leq m$) and the template and query sequence are assumed to be unit length. This lower bound can be proved using the same techniques as in [Eamonn Keogh and Chotirat Ann Ratanamahatana, 2005].

B. Correction Factors

After the DTW score is calculated, correction factors are applied that inflate this score based on additional dissimilarities not as easily perceived by only time warping measures, a method adopted from CIDDTW [Gustavo E. A. P. A. Batista et al., 2011]. These correction factors, however, use the inverse inner product of normalized feature vectors:

$$f_i(T, Q) = \frac{1}{\langle g_i(T), g_i(Q) \rangle}, \quad (20)$$

where $2 \leq i \leq F$ per Equation 14 and each $g_i$ transforms the time series into a normalized vector whose dimensionality is greater than one (otherwise its normalization would simply result in a scalar equal to one). The vector must also comprise only non-zero components so that the denominator of Equation 20 falls in (0, 1] and the domain of $f_1$ becomes $[1, \sqrt{ })$. Intuitively, times series that are similar should score near one so that DTW score inflation is minimized.

Two correction factor transformations that are designed specifically for gestures will now be described herein; these correction factor transformations are inspired indirectly by Rubine's features for pen-based gesture recognition [Dean Rubine, 1991]. In both cases, between-component information that is scale- and position-invariant is the focus. These latter attributes are important to ensure that differences between users do not appear as dissimilarities in their gesticulations. First, the component-wise absolute distance traversed by gesture P is given by:

$$g_{abs} = \sum_{i=1}^{n-1} |\vec{p}_i|. \quad (21)$$

Once $g_{abs}$ is normalized, the components of this vector yield a relative measure of the total distance traveled by each component—this correction factor helps to ensure that the contributions to the gesture path for each component of two different samples are similar in measure.

The second feature is based on the bounding box extents of the concatenated unnormalized direction vectors in $R^m$ space:

$$g_{bb} = bb_{max} - bb_{min}, \quad (22)$$

$$bb_{max} = \left(bb_{max,j} = \max_{1 \leq i \leq n} \sum_{i=1}^{n-1} p_{i+1}^j - p_i^j\right),$$

$$bb_{min} = \left(bb_{min,j} = \min_{1 \leq i \leq n} \sum_{i=1}^{n-1} p_{i+1}^j - p_i^j\right).$$

Once normalized, the relative distances spanned by each component is determined. This bounding box correction factor was found to be useful in compensating for gestures that are mostly similar, except in span. Consider two gestures: climb ladder, which is a hand over hand action, and balance, which is a seesaw-like action with arms extended [Chris Ellis, Syed Zain Masood, Marshall F. Tappen, Joseph J. Laviola, Jr., and Rahul Sukthankar. 2013. Exploring the Trade-off Between Accuracy and Observational Latency in Action Recognition. International Journal of Computer Vision 101, 3 (February 2013), 420-436]. In both cases, the hands, wrists, and elbows oscillate vertically. The only major difference is that one's arms are extended outward to perform the balance gesture. This extension, which occurs at the beginning of the action, represents only a small duration of the entire gesture and may be difficult to detect with either ED or IP, depending exactly on how a participant performs either gesture. However, the bounding box (span) of each gesture is very different, which is why using the bounding box as a correction factor can improve recognition accuracy.

C. Establishing the Rejection Threshold

How one can determine an appropriate per template rejection threshold from only a minimum amount of training data remains a difficult problem. Liu and Chua [Xiao-Hui Liu and Chin-Seng Chua. 2010. Rejection of non-meaningful activities for HMM-based activity recognition system. Image and Vision Computing 28, 6 (2010), 865-871] summarize three common approaches for rejecting negative samples: build a set of garbage models from a set of explicitly defined unwanted patterns, learn a cut off based on the distribution of scores between classes, or generate mixture models from positive samples to form a universal background model (UBM). These are general methods used across various fields and in particular the UBM approach stems from speaker recognition [Douglas A Reynolds, Thomas F Quatieri, and Robert B Dunn. 2000. Speaker verification using adapted Gaussian mixture models. Digital signal processing 10, 1 (2000), 19-41]. In all of these cases, there is a sufficient amount of training data to construct representative probability distributions, which is not possible with only one or two training samples per gesture class.

As will be discussed, the current method for determining rejection threshold is most like UBM, where negative samples are synthetically generated from positive samples, although an explicit background model is not generated. Instead, the distribution of scored synthetic negative and positive samples is used to help select a rejection threshold. To increase the positive sample distribution, new samples are synthetically generated using gesture path stochastic resampling [Eugene M. Taranta, II, Mehran Maghoumi, Corey R. Pittman, and Joseph J. LaViola, Jr. 2016. A Rapid Prototyping Approach to Synthetic Data Generation for Improved 2D Gesture Recognition. In Proceedings of the 29th Annual Symposium on User Interface Software and Technology (UIST '16). ACM, New York, N.Y., USA, 873-885], which was discussed previously.

With sufficient amounts of training data, a recognizer can estimate within class score probability densities and select thresholds sufficiently low enough to prevent type II (false negative) errors. One can also use negative samples that are non-gesture sequences to help control type I (false positive) errors by ensuring that a rejection threshold is sufficiently high enough to prevent false positives. With access to both positive and negative samples, one can instead select a threshold that minimizes both error types. However, it is assumed herein that only a minimum number of positive training samples are given, as little as one or two per gesture class. This limitation implies that both negative and positive samples need to be synthesized.

To create negative samples, positive samples are spliced together to create semi-nonsense, noise-like sequences. This approach was favored because negative samples have parts of real gestures embedded within to ensure that current method can reject sequences that partially resemble but are not actually real gestures. To generate synthetic negative samples, k training samples are randomly sampled, and from each sample, (n−1)/k sequential direction vectors are randomly sampled. These direction vectors are concatenated together to form a negative sample. Each template is then compared with the negative sample using DTW and save the results per template. This process is repeated a number of times, after which the scores are z-score normalized per template.

The generation of synthetic positive samples requires a different approach. Gesture path stochastic resampling (GPSR) [Id.] is a new synthetic data generation developed specifically for 2D gestures and rapid prototyping. A gesture path is nonuniformly resampled to n+x points, after which the distance between subsequent points is normalized to unit length, and finally x random points are removed. GPSR was shown to produce realistic results for pen and touch gestures; however, for use herein, realism is not required. Rather, a distribution of samples should just be created that when evaluated with DTW generates a score distribution similar to the true distribution, and it was found that GPSR works well for this purpose.

[Id.] provides additional information on implemented details and pseudocode. In the current method, GPSR is used to create synthetic positive samples that are scored with DTW against their seed samples. These within class scores are then z-score normalized using the mean and standard deviations generated from the negative samples evaluation above.

Now that the rejection threshold can be determined, with the distribution of positive and negatives samples (all of which have been z-score normalized), a standard deviation $\lambda$ is selected that minimizes the aggregate false and negative positive count. Since a noise-like pattern was used for training, an object is to be able to reject idle-like motion (to increase tolerance to higher energy patterns, the minimization can non-uniformly weight the importance of true and false positives). The per template rejection threshold d is then:

$$\delta_i = \mu_i - \lambda \sigma_i, \qquad (23)$$

where $\mu_i$, is the mean of the negative sample scores relative to each template i and $\sigma$ is its standard deviation. This approach appears to select thresholds near the optimum.

Figure 14:
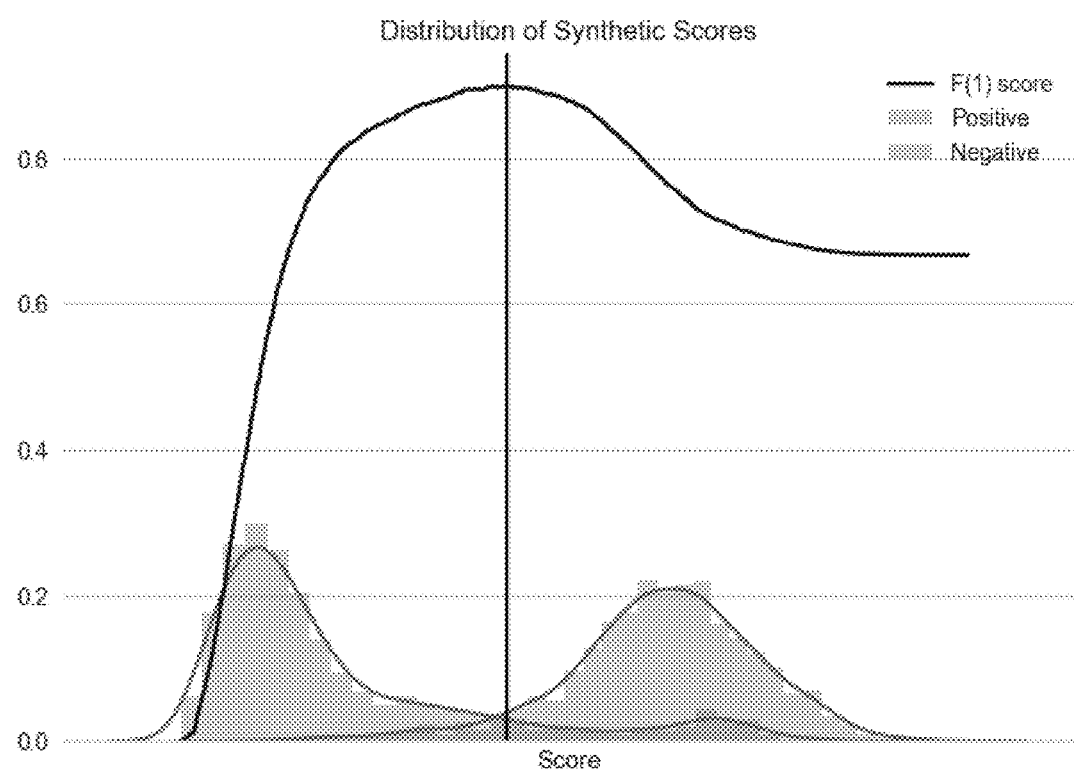
FIG. 14 is a graphical illustration depicting positive probability distribution and negative probability distribution, leading to generation of the F-1 score.

FIG. 14 further depicts creation of an "F-1 score", an objective function derived from creation of the positive probability distribution and the negative probability distribution. This objective function is estimated for each possible score using the probability distributions, and where the function is maximized is what is selected to be the rejection threshold.

D. Examination of the Distributions

To examine the distribution of scores generated by current method for a specific dataset, the following was done: For a given subject, a recognizer is trained with one random sample per gesture class. All z-score normalized synthetic scores generated as part of the training process are saved for analysis. An additional, but unique, test sample per gesture class is subsequently evaluated, and the within class DTW score of each test sample, before and after correct factor inflation, are similarly z-score normalized and saved. Lastly, new synthetic negative samples are again generated, scored, and saved. This process is repeated 10 times per subject and all results are combined into a single set of distributions.

Figure 12A:
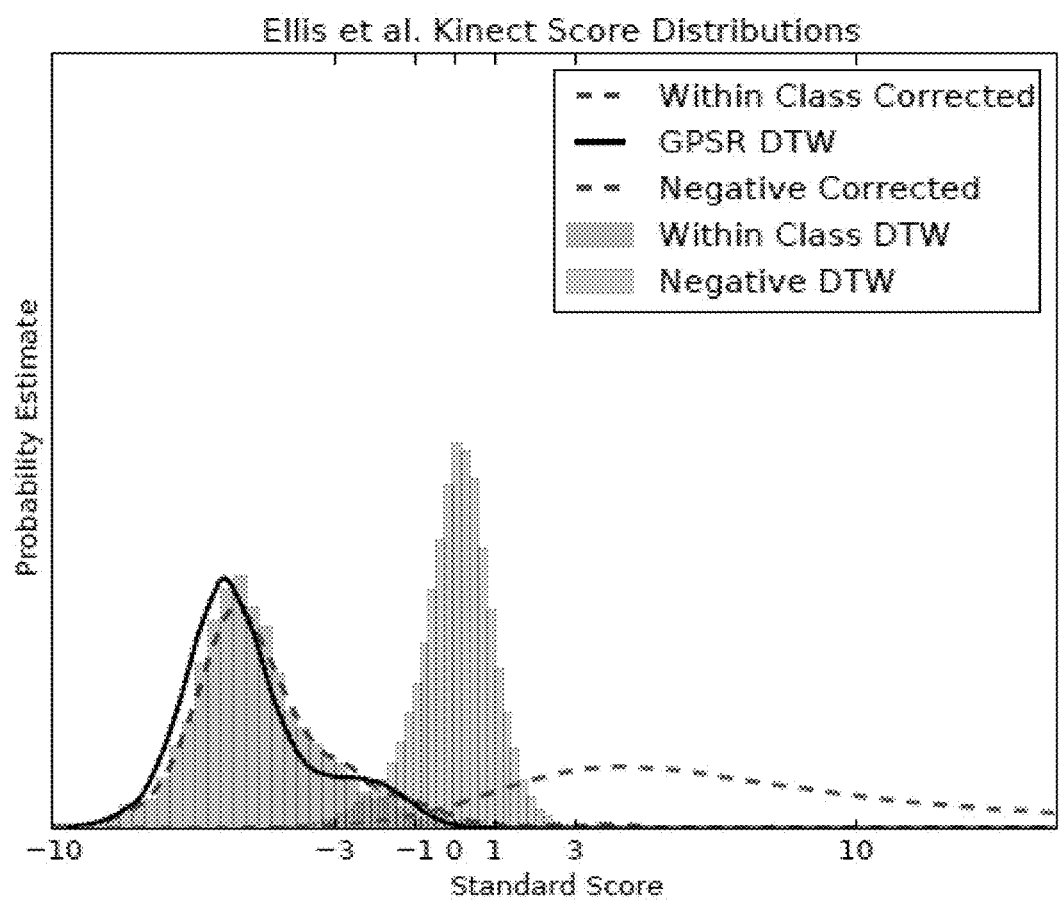
FIG. 12A is a graphical illustration depicting normalized distributions of within class and negative samples before and after correction factors are applied, as well as the synthetic positive sample distribution for Ellis et al.'s dataset.
Figure 12B:
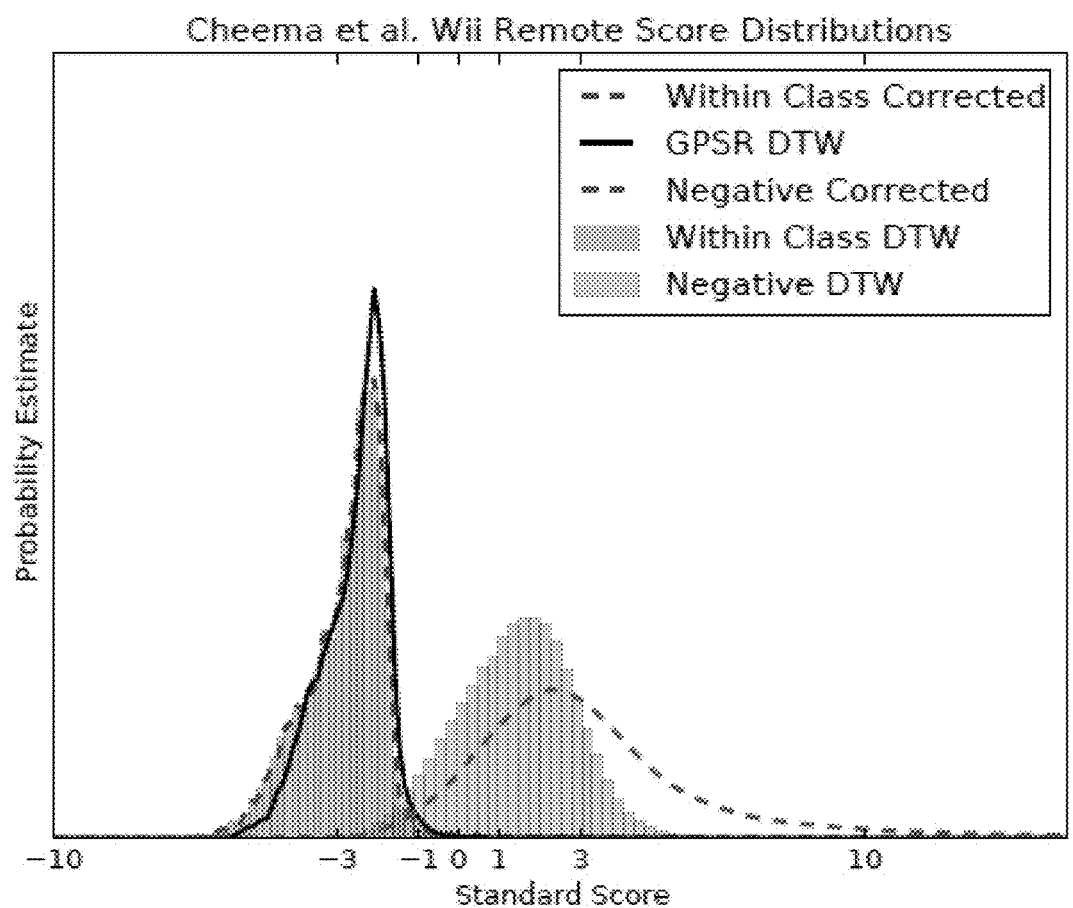
FIG. 12B is a graphical illustration depicting normalized distributions of within class and negative samples before and after correction factors are applied, as well as the synthetic positive sample distribution for Cheema et al.'s dataset.

Results are shown in FIGS. 12A-12B. A first observation is that the within class samples distribution is well separated from the negative samples, having only a small amount of overlap, which is perceived as a desirable property for a noise pattern; a poor noise distribution would be far away from the within class samples and result in unreliable rejections thresholds (no false positives or false negatives). Second, the within class corrected DTW scores are remarkably close to the true distribution of the uncorrected DTW scores, whereas the distribution of negative samples are shifted right, away from the within class distribution. This observation suggests that the correction factors are doing their job, although further analysis (as is discussed below) will quantitatively confirm this. Finally, the positive samples generated using GPSR form a score distribution that is quite near the true distribution. This does not imply that the synthetic samples are realistic, but it does help build confidence that GPSR can be used to help find a reasonable rejection threshold when used in combination with synthetic negative samples.

E. Evaluation of Segmented Data

In order to evaluate current method, a number of publicly available gesture datasets that span a range of input modalities was considered. Where appropriate, the current recognizer was compared against alternative methods. In general, the comparison started with low dimensional data and worked into higher dimensions. Repeated measures full factorial ANOVA analysis was performed to understand if there are statistically significant differences between the recognizer variants evaluated. However, because recognition error rates are often quite low, accuracy measures are often non-normally distributed and may also violate the homogeneity of variance assumption, which is why the Aligned Rank Transform method was used for ANOVA analysis [Jacob O. Wobbrock et al., 2011]. In the ANOVA results tables, the measure factor is either Euclidean distance (ED) or inner product (IP), and the correction factors (CF) are either disabled (False) or enabled (True). Further, T=x specifies that x samples (templates) per gesture class are used for training.

i. Pen and Touch

Tables 5-6 present results for variants of the current method on the $1-GDS pen and touch dataset [Jacob O. Wobbrock et al., 2007]. This dataset contains 4800 samples of 16 pen gestures collected from 10 participants. Results were obtained using a writer-independent protocol. The reason for focusing on writer-independence is that state-of-the-art recognizers already achieve near perfect recognition rates in writer-dependent tests on this dataset. Given a training participant, our writer-independent protocol randomly selects T samples per gesture class from that participant for training. Next, one sample per each gesture class is randomly selected from the pool of samples from all other participants, which is used as the test set. This sampling process is repeated 500 times, and all results for the training participant are combined into a single average accuracy value for that individual. This process is repeated for each participant, so that each is used to supply training data.

TABLE 5

Writer-independent mean accuracies for variants of the current system on $1-GDS, as well as ANOVA results with statistically significant effects italicized and their effect size labeled: (L)arge, (M)edium, or (S)mall.

|  |  | T = 1 |  | T = 2 |  |
|---|---|---|---|---|---|
| Measure | CF | μ | (σ) | μ | (σ) |
| ED | False | 0.91 | (0.03) | 0.92 | (0.03) |
| ED | True | 0.91 | (0.03) | 0.92 | (0.03) |
| IP | False | 0.94 | (0.02) | 0.95 | (0.03) |
| IP | True | 0.94 | (0.02) | 0.95 | (0.03) |

| Effect | $F_{1,63}$ | Pr(>F) | $\eta_p^2$ |  |
|---|---|---|---|---|
| Measure | 412.65 | *<.001* | .87 | (L) |
| CF | 0.33 | .57 | .01 | — |
| Templates | 86.8 | *<.001* | .58 | (L) |
| Measure × CF | 0.0 | .96 | .00 | — |
| Measure × Templates | 10.84 | *<.01* | .15 | (L) |
| CF × Templates | 0.13 | .72 | .00 | — |
| Measure × CF × Templates | 0.02 | .88 | .00 | — |

TABLE 6

Writer-independent mean accuracies for several recognizers on $1-GDS. There is a significant different between the recognizers with a large effect size ($F_{2,45}$, p < .001, $\eta_p^2$ = .92). A post hoc analysis shows that all recognizers are significantly different from each other.

|  | T = 1 |  | T = 2 |  |
|---|---|---|---|---|
| Recognizer | μ | (σ) | μ | (σ) |
| Current | 0.94 | (0.02) | 0.95 | (0.03) |
| $1 | 0.88 | (0.02) | 0.90 | (0.01) |
| $P | 0.84 | (0.02) | 0.86 | (0.02) | ii. WII Remote

In Table 7, results are reported for variants of the current method on Cheema et al.'s WII Remote dataset [Salman Cheema, Michael Hoffman, and Joseph J. LaViola Jr. 2013. 3D Gesture classification with linear acceleration and angular velocity sensing devices for video games. Entertainment Computing 4, 1 (2013), 11-24]. This dataset contains 15625 samples of gestures collected from 25 participants who individually provided 25 samples per gesture. This dataset is particularly interesting because as compared to other WII Remote datasets, the gesture vocabulary is large at 25 classes and the WII Remote traverses through various orientations. Results were obtained using a user-dependent protocol similar to the work of Cheema et al. [Id.]. For each experiment in this protocol, T samples are selected at random from a participant for training and the remaining 25 T samples are selected for testing, and this selection process is performed 500 times per each participant. A user-independent protocol was not run because device orientation has a significant impact on the accelerometer signal data, and there is a great deal of variance in how the WII Remote is held by each participant. However, applications that track device orientation can easily adjust the signals in order to support user-independence. To improve accuracy for the inner product (IP) variant of the current method, the acceleration data was integrated into 3D position points per [Sven Kratz and Michael Rohs. 2011. Protractor 3D: a closed-form solution to rotation-invariant 3D gestures. In Proceedings of the 16th international conference on Intelligent User Interfaces. ACM, 371-374], but this was found to be unhelpful for the squared Euclidean distance variant (ED). There was a significant difference between the ED and IP measures, where the IP measure gave higher accuracies. There was also a small positive effect when utilizing the correction factors; though, due to truncation, this cannot be seen in the table.

TABLE 7

User-dependent mean accuracies for variants of the current system on Cheema et al.'s WII Remote dataset, as well as ANOVA results with statistically significant effects italicized and their effect size labeled: (L)arge, (M)edium, or (S)mall.

|  |  | T = 1 |  | T = 2 |  |
|---|---|---|---|---|---|
| Measure | CF | μ | (σ) | μ | (σ) |
| ED | False | 0.79 | (0.05) | 0.86 | (0.04) |
| ED | True | 0.80 | (0.05) | 0.86 | (0.04) |
| IP | False | 0.93 | (0.03) | 0.96 | (0.02) |
| IP | True | 0.93 | (0.03) | 0.96 | (0.02) |

TABLE 7-continued

User-dependent mean accuracies for variants of the
current system on Cheema et al.'s WII Remote dataset,
as well as ANOVA results with statistically
significant effects italicized and their effect size
labeled: (L)arge, (M)edium, or (S)mall.

| Effect | $F_{1,168}$ | Pr(>F) | $\eta_p^2$ |
|---|---|---|---|
| Measure | 1747.23 | *<.001* | .91 (L) |
| CF | 3.91 | *<.05* | .02 (S) |
| Templates | 314.67 | *<.001* | .65 (L) |
| Measure × CF | 2.23 | .14 | .01 (S) |
| Measure × Templates | 44.05 | *<.001* | .21 (L) |
| CF × Templates | 0.17 | .68 | .00 — |
| Measure × CF × Templates | 0.03 | .86 | .00 — |

Next, the best performing variant of the current method was compared against alternative domain-specific recognizers (DTW with quantization [Jiayang Liu, Lin Zhong, Jehan Wickramasuriya, and Venu Vasudevan. 2009. uWave: Accelerometer-based personalized gesture recognition and its applications. Pervasive and Mobile Computing 5, 6 (2009), 657-675. PerCom 2009], $3 [Sven Kratz and Michael Rohs. 2010. The $3 recognizer: simple 3D gesture recognition on mobile devices. In Proceedings of the 15th international conference on Intelligent user interfaces. ACM, 419-420], and Protractor 3D [Sven Kratz and Michael Rohs, 2011]), whose results are shown in Table 8. DTW with quantized accelerometer data performed slightly better than current method, although accuracies were similar. It is noted that other than the common step to integrate acceleration samples into position trajectories, current method did not require domain specific knowledge to achieve high accuracy. On the other hand, DTW with quantized data required an analysis of the accelerometer data and a selection of the quantization levels, which may be domain or device specific.

TABLE 8

User-dependent mean accuracies for various recognizers on
Cheema et al.'s WII Remote dataset. The recognizer's main
effect is significant with a large effect size ($F_{3,168}$ = 789.72,
p < .001, $\eta_p^2$ = .93(L)). Post hoc tests show that all recognizers
are also significantly different from each other.

| | T = 1 | | T = 2 | |
|---|---|---|---|---|
| Recognizer | μ | (σ) | μ | (σ) |
| DTW (with quantization) | 0.94 | (0.03) | 0.97 | (0.02) |
| Current | 0.93 | (0.03) | 0.96 | (0.02) |
| $3 | 0.71 | (0.06) | 0.79 | (0.06) |
| Protractor 3D | 0.63 | (0.06) | 0.73 | (0.06) | iii. KINECT

In Table 9, results are presented for the Ellis et al. (Parkour) [Chris Ellis et al., 2013] KINECT dataset, which contains 1280 samples of 16 parkour actions, e.g. climbing and vaulting, collected from 16 participants using a KINECT sensor. The same user-dependent test protocol was used as reported previously. The local cost function was significant, where the current method with IP measure outperformed ED, and IP was able to achieve 99% accuracy with one training sample. The correction factors were also significant and played a role in substantially driving down the error rates (note that as accuracies reach high levels, seemingly small improvements in accuracy are actually large reductions in error rates). A user-independent variant of this test was run and it was found that IP with correction factors and T=2 achieved 96% accuracy, whereas ED with correction factors achieved 70%.

TABLE 9

User-dependent mean accuracies for variants of the current
system on the Parkour dataset, as well as ANOVA
results with statistically significant effects italicized and
their effect size labeled: (L)arge, (M)edium, or (S)mall.

| | | T = 1 | | T = 2 | |
|---|---|---|---|---|---|
| Measure | CF | μ | (σ) | μ | (σ) |
| ED | False | 0.88 | (0.05) | 0.93 | (0.03) |
| ED | True | 0.89 | (0.05) | 0.94 | (0.03) |
| IP | False | 0.97 | (0.03) | 0.99 | (0.02) |
| IP | True | 0.99 | (0.02) | 0.99 | (0.01) |

| Effect | $F_{1,105}$ | Pr(>F) | $\eta_p^2$ |
|---|---|---|---|
| Measure | 383.89 | *<.001* | .79 (L) |
| CF | 16.62 | *<.001* | .14 (M) |
| Templates | 80.36 | *<.001* | .43 (L) |
| Measure × CF | 1.73 | .19 | .02 (S) |
| Measure × Templates | 35.86 | *<.001* | .25 (L) |
| CF × Templates | 3.38 | .07 | .03 (S) |
| Measure × CF × Templates | 0.0 | .96 | .00 — |

Ellis et al.'s observational latency test [Id.] was also replicated, where the test evaluated recognizer accuracy when training and test data were truncated to varying frame counts in order to minimize the delay between when a user performs an action and when the time that action is recognized. If an action can be recognized before completion, observational latency can be reduced. In Table 10, it can be seen that current method with IP achieves the highest accuracy for all frame count levels.

TABLE 10

Recognition percentage accuracies for the current system and
recognizers evaluated by Ellis et al. (bottom three) for varying
length video sequences Both training and testing data
are truncated to the specified number of frames.

| Recognizer | 10 | 15 | 20 | 25 | 30 | 40 | 60 |
|---|---|---|---|---|---|---|---|
| Current, IP with CF | 24 | 53 | 78 | 90 | 95 | 98 | 99 |
| Ellis et al. | 14 | 37 | 65 | 82 | 91 | 95 | 96 |
| Conditional Random Field | 15 | 25 | 47 | 67 | 81 | 91 | 94 |
| Bag of Words | 11 | 21 | 44 | 68 | 83 | 92 | 94 | iv. Acoustic Gestures

Hand based gesture interactions with computers via Doppler shifted sound waves is presently gaining attention [Sidhant Gupta, Daniel Morris, Shwetak Patel, and Desney Tan. 2012. Soundwave: using the doppler effect to sense gestures. In Proceedings of the SIGCHI Conference on Human Factors in Computing Systems. ACM, 1911-1914; Wenjie Ruan, Quan Z Sheng, Lei Yang, Tao Gu, Peipei Xu, and Longfei Shangguan. 2016. AudioGest: enabling fine-grained hand gesture detection by decoding echo signal. In Proceedings of the 2016 ACM International Joint Conference on Pervasive and Ubiquitous Computing. ACM, 474-485]. Unlike other interface devices evaluated to this point, sound waves are especially subject to noise as extracting and detecting frequency changes over a large spectrum with low cost hardware still lacks robustness. Further, complex overthe-air hand gestures are prone to large variations in shape and speed, the latter of which manifests itself uniquely in frequency distributions (unlike in 2D or 3D Euclidean space where speed alone does not change the observed trajectory). These issues make accurate gesture recognition difficult. To test whether the current method is suitable for this input modality, a new dataset was collected, comprising eighteen dynamic hand gestures collected from 22 participants with a 5 speaker, 1 microphone setup based on [Corey Pittman, Pamela Wisniewski, Conner Brooks, and Joseph J. LaViola Jr. 2016. Multiwave: Doppler Effect Based Gesture Recognition in Multiple Dimensions. In Proceedings of the 2016 CHI Conference Extended Abstracts on Human Factors in Computing Systems. ACM, 1729-1736] (see our project website for more details). The raw data is represented as a 33-frequency bin distribution per speaker, which results in an m=165 component vector per frame. Results of the current method are shown in Table 11, which were obtained using the user-dependent protocol [Salman Cheema et al., 2013] described previously. In early testing, it was learned that z-score normalization on the spectrum data was harmful, perhaps because for some gestures, there is no motion through certain frequency bins, and so z-score normalizing those components only served to scale up noise. Therefore, ED is also reported, which is the squared Euclidean distance measure on raw data without z-score normalization. Additionally, since the bounding box correction factor does not have meaning in this context, only the absolute distances traveled correction factor was utilized.

TABLE 11

User-dependent accuracy results for variants of the current system on the acoustic gesture dataset, as well as ANOVA results with statistically significant effects italicized and their effect size labeled: (L)arge, (M)edium, or (S)mall. ED- indicates that sequences were not z-score normalized.

| Measure | CF | T = 1 | | T = 2 | | T = 4 | |
|---|---|---|---|---|---|---|---|
| | | $\mu$ | $(\sigma)$ | $\mu$ | $(\sigma)$ | $\mu$ | $(\sigma)$ |
| ED | False | 0.71 | (0.08) | 0.81 | (0.08) | 0.87 | (0.07) |
| ED | True | 0.75 | (0.07) | 0.83 | (0.06) | 0.89 | (0.05) |
| ED- | False | 0.83 | (0.07) | 0.90 | (0.05) | 0.94 | (0.04) |
| ED- | True | 0.84 | (0.06) | 0.91 | (0.05) | 0.94 | (0.04) |
| IP | False | 0.72 | (0.07) | 0.81 | (0.06) | 0.88 | (0.06) |
| IP | True | 0.75 | (0.06) | 0.84 | (0.05) | 0.90 | (0.05) |

| Effect | F Value | Pr(>F) | $\eta_p^2$ |
|---|---|---|---|
| Measure | $F_{2,483} = 491.46$ | <.001 | .67 (L) |
| CF | $F_{1,483} = 72.36$ | <.001 | .13 (M) |
| Templates | $F_{3,483} = 551.31$ | <.001 | .77 (L) |
| Measure × CF | $F_{2,483} = 10.02$ | <.001 | .04 (S) |
| Measure × Templates | $F_{6,483} = 11.41$ | <.001 | .12 (M) |
| CF × Templates | $F_{3,483} = 1.76$ | .15 | .01 (S) |

As is shown, the local distance measure and correction factor effects are significant. In a post hoc analysis, it was found that ED was significantly different from ED and IP, but the latter measures where not different from each other. Good accuracy (≥90%) can be achieved with ED with two templates, otherwise four templates are required with IP.

v. Performance

Over 10,000 iterations, using the current method, a C++ based recognizer was trained with the KINECT user study data, which is 63 components per point. The recognizer was trained with T=10 templates per gesture class, resulting in 140 templates (since there are 14 gesture classes). The recognizer was then used to evaluate one additional sample per gesture class and the evaluation time in microseconds per sample was recorded. On a MacBook Pro, 2.2 GHz Intel Core i7 with 8 GB DDR3 memory, the average time to execute a recognition test on a raw sample was 395 µs (std=90.2); or equivalently, the evaluation process took approximately 2.82 µs (0.64) per template, amortized.

F. Evaluation of Continuous Data

To evaluate the effectiveness of our approach in rejecting non-gesture sequences from a continuous data stream, test data was collected from a pool of 40 students (30 male and 10 female) at the University of Central Florida, ranging in age from 18 to 28. The participants were divided into two groups where the first group worked with a KINECT and the second group worked with a LEAP MOTION. Segmented training data of the gestures was collected and is shown in Tables 8 and 9; additionally, a continuous, uninterrupted session of the sample gestures performed in random order with repetitions was also collected and will be discussed as this specification continues. Each participant took around 15 to 20 minutes to complete all tasks.

The experimental setup comprised a 50 inch SONY BRAVIA HDTV and a MICROSOFT KINECT 2.0 or LEAP MOTION. The KINECT sensor was mounted above the HDTV using a mounting device and was kept stationary throughout all sessions. The LEAP MOTION sensor was mounted on a desktop in front of the television and was kept in place through a single session using tape, except in one case where the participant was left-handed and the sensor's orientation was changed to accommodate for their comfort. Further, a box was placed between the participant and the device so one could rest their arm and avoid fatigue, which also helped to control the distance and orientation of a participant's hand during the study.

i. Data Collection

A data collection utility was developed with two modes using Unity 3D v5.4. The first mode allowed us to collect clean, segmented samples of each gesture for training. A participant was asked to perform a specific gesture that was initiated by a count down. The sequence was then resampled and replayed to ensure correctness. If an error occurred or the participant was unhappy with the replay, the sample was discard and recollected. This process was repeated twice so two training samples per gesture were collected. Note that all gestures were demonstrated to a participant before any data was collected. The second mode enabled us to collect a continuous stream of gesture articulations. The application prompted the participant to perform a specific gesture selected at random, and once it was confirmed that the correct action was performed, the application was manually advanced to the next gesture. Otherwise, if an error occurred, e.g., a malformed gesture or loss of tracking, the action was retried. A proper example of each gesture was collected three times so that there was a total of 14×3 valid KINECT gestures and 8×3 valid LEAP MOTION gestures included in the unsegmented stream.

It appeared that the KINECT lost track of some participants more frequently than others, which may be related to the texture and colors of the participants clothing. In such cases the skeleton appeared jittery on the screen and gesture were repeated as necessary. The LEAP MOTION device also frequently lost tracking and detected incorrect hand poses, such as reporting that both the index and middle fingers were extended when, in fact, only the index was so. These problems were exacerbated with 5 participants who had smaller hands. Also, data was collected for 9 LEAP MOTION gestures, but it was found that one gesture (not shown in FIG. 13B) was difficult for participants to perform. This gesture was removed from the analysis.

ii. Results

Using data collected from each participant, the current system was trained and the participant's session was replayed. All classification results including true and false positives (tp and fp) as well as true and false negatives (tn and fn) were averaged into an overall result. Additional parameters were tuned as follows: the recognizer was run once every 10 frames using the last four seconds of buffered frame data. Four seconds was used because some gestures were performed slowly by some participants, though a shorter duration could have been used in most cases. Since the gesture paths are resampled to n=16, idle frames did not significantly contribute to the shape of the action. Once an action was detected, the buffer was cleared and the recognizer was suspended for 2 seconds, which was believed to be sufficient time to prepare for the next gesture; and a gesture was considered as executed if the current system returned the same result twice in a row. Based on these experiences, these are fairly reasonable criteria, which can be tuned to match a practitioner's specific requirements.

The above procedure was re-run several times for different levels of $\lambda$ used to set the rejection threshold (see Equation 23). Table 12 shows results for the KINECT continuous data test, and Table 13 shows results for the LEAP MOTION test.

TABLE 12

Figure 13A:
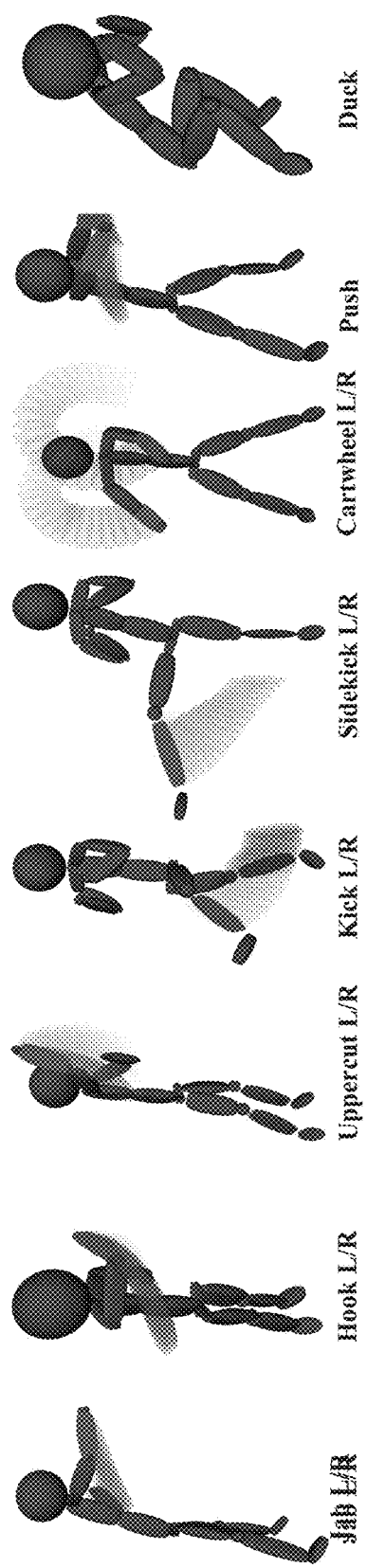
FIG. 13A depicts fourteen (14) KINECT gestures used in the contiguous data study. Note that L/R indicates there is a left and right side version of the gesture.
Figure 13B:
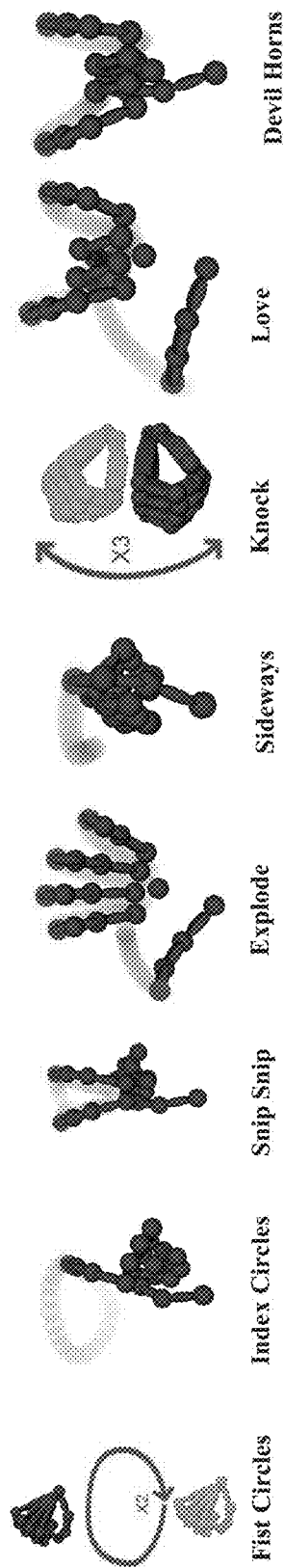
FIG. 13B depicts eight (8) LEAP MOTION gestures used in the contiguous data study. Each gesture starts with one's hand in a first and ends in the same position.

T = 2 Percentage accuracy results for various rejection thresholds on the KINECT gesture dataset shown in FIG. 13A. The last entry is the threshold that was automatically selected.

| $\lambda$ | $F_1$ Score $\mu$ ($\sigma$) | Precision $\mu$ ($\sigma$) | Recall $\mu$ ($\sigma$) | FPR $\mu$ ($\sigma$) | Pruned $\mu$ ($\sigma$) |
|---|---|---|---|---|---|
| 1.5 | 95.7 (5) | 95.4 (5) | 96.1 (6) | 0.3 (0) | 89.2 (6) |
| 1.75 | 96.0 (6) | 96.0 (6) | 96.1 (7) | 0.3 (0) | 90.1 (5) |
| 2.0 | 96.9 (5) | 97.3 (5) | 96.5 (6) | 0.2 (0) | 90.9 (5) |
| 2.25 | 96.4 (6) | 97.5 (4) | 95.5 (7) | 0.2 (0) | 91.7 (5) |
| 2.5 | 95.9 (6) | 97.5 (4) | 94.5 (8) | 0.2 (0) | 92.6 (4) |
| -2.75 | 95.1 (5) | 97.5 (3) | 93.0 (8) | 0.2 (0) | 93.3 (4) |
| 1.98 | 96.4 (5) | 96.8 (5) | 96.1 (6) | 0.2 (0) | 90.8 (5) |

TABLE 13

T = 2 Percentage accuracy results for various rejection thresholds on the LEAP MOTION gesture dataset shown in FIG. 11B. The last entry is the threshold that was automatically selected.

| $\lambda$ | $F_1$ Score $\mu$ ($\sigma$) | Precision $\mu$ ($\sigma$) | Recall $\mu$ ($\sigma$) | FPR $\mu$ ($\sigma$) | Pruned $\mu$ ($\sigma$) |
|---|---|---|---|---|---|
| 1.5 | 93.8 (5) | 93.3 (7) | 95.0 (7) | 0.8 (0) | 54.8 (7) |
| 1.75 | 94.4 (5) | 95.0 (5) | 94.4 (8) | 0.6 (0) | 58.1 (7) |
| 2.0 | 94.3 (5) | 95.8 (5) | 93.3 (8) | 0.5 (0) | 62.5 (7) |
| 2.25 | 94.0 (7) | 97.7 (3) | 91.5 (11) | 0.3 (0) | 66.2 (6) |
| 2.5 | 92.8 (8) | 98.1 (3) | 89.4 (13) | 0.2 (0) | 70.2 (6) |
| -2.75 | 90.9 (10) | 98.3 (2) | 86.3 (15) | 0.2 (0) | 73.7 (5) |
| 1.98 | 93.8 (6) | 95.7 (5) | 92.5 (9) | 0.5 (0) | 61.8 (8) |

The rejection threshold is important in balancing precision (tp/(tp+fp)) and recall (tp/(tp+fn)), and the $F_1$ score is the harmonic mean of these measures. Therefore, the goal was to maximize $F_1$. In the KINECT test, 96.9% was achieved at $\lambda$=2.0, which is close to the automatically selected threshold $\lambda$=1.98. Similarly, the maximum $F_1$ score of 94.4% for the LEAP MOTION test occurred at $\lambda$=1.75, which again is near the automatically selected $\lambda$=1.95.

Recall that the automatic threshold is selected so that the false and true negatives generated from synthetic data is minimized, which appear to be appropriate for idle movement in between actions. However, $\lambda$ can also be increased to allow for a larger variety of non-gesture actions to be performed at the expense increased false negatives. According to the results, the effect on the $F_1$ score is not too large, where the improvement in precision may well be worth the loss in recall for many applications. These results suggest that the current method is useful for working with continuous data.

The current method/system is designed to be an efficient and effective recognizer for gesture interface development that can span multiple modalities and still achieve competitive accuracy. By combining DTW with concepts developed for 2D gesture recognition, for rapid prototyping and gesture customization, the recognizer accomplished its objective. There is no simple criterion by which one can judge a recognizer and determine that is it excellent or terrible. At best, other recognizers can be compared in a specific domain for a specific dataset when such is available, and only relative terms can be used. In this way, it can be seen that the current method is very effective and efficient. Examples include the $1-GDS pen and touch dataset where the current system with IP outperformed $1 and $P; Cheema et al.'s WII Remote datasets, where the current system was on par with the domain-specific quantized DTW; and Ellis et al.'s [Chris Ellis et al., 2013] Parkour dataset, where the current recognizer achieved 99% accuracy with one training sample, and can be used to reduce observational latency. Even with atypical gesture data such as sound frequencies, the current method is able to reach greater than 90% accuracy with only two training samples per gesture. From another perspective, based on accuracy results reported for 36 3D gesture recognizers across different domains [Joseph J LaViola, 2013] (Table 5), one might expect a competitive recognizer to fall between 88-98% (93%±5.29%) accuracy. In all tests performed, the current method fell in this range.

However, a gesture recognizer can only be a go-to option if it can also support continuous data, which requires robust rejection. By using GPSR [Eugene M. Taranta, II et al., 2016] to create synthetic positive samples that are combined with synthetic negative samples, a per template rejection threshold can be learned with only one training sample per gesture class. Using an evaluation of continuous data, it can be seen that this automatic process is able to derive a threshold near the optimum.

In conclusion, presented herein is a general gesture recognizer suitable for rapid prototyping and gesture customization that works well with little training data as well as continuous data. The current recognizer used DTW with an inner product local cost function on normalized gesture path direction vectors, which was shown to outperform the squared Euclidean distance alternative in most tests, although the current method can be equipped with either measure. Two new correction factors for DTW were also introduced, where the correction factors help disambiguate certain gesture classes and inflate negative, non-gesture sample scores. Finally, a new method of automatically selecting a rejection criteria for continuous data was discussed, where the method can select a threshold close to the optimum. Overall, it was demonstrated herein that the current shows promise of being a capable and robust go-to gesture recognizer.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, graphics processing unit (GPU), or other programmable data processing apparatus to produce a machine, such that the instructions, which execute via the processor of the computer, GPU device, or other programmable data processing apparatus, create means for implementing the functions/acts specified in the flowchart and/or block diagram block or blocks.

These computer program instructions may also be stored in a computer readable medium that can direct a computer, GPU device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, GPU device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

About: This term is used herein to refer to approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

Application: This term is used herein to refer to a specific implementation of the methodology of generating synthetic data.

Given Input: This term is used herein to refer to a specified sample (e.g., a gesture) that is processed by a computer with the intention of generating an output (i.e., synthetic variant) based on that sample.

Input Samples: This term is used herein to refer to future inputs (e.g., gestures) whose appearances are estimated, based on synthetic variants generated from the initial given input. For example, input samples indicate what is the underlying gesture.

Input Time Series of K Points: This term is used herein to refer to a set of time-valued data points (e.g., representative of a gesture) that is received by a computer processor for generation of synthetic data therefrom.

Non-Input Samples: This term is used herein to refer to sets of data points that are different from the positive input samples and thus are not representative of the initial given input/sample. For example, out-of-class measurements indicate what is not the underlying gesture.

Non-Uniform: This term is used herein to refer to a plurality of values being different from each other.

Optimal n Value: This term is used herein to refer to a cardinality of sample points that is established or selected in order to generate a synthetic variant that is both accurate to the given input/sample and flexible to future inputs intended to be representative of the given input/sample. This value is highly dependent on the underlying given input/sample. In certain scenarios, such as with an input of a left curly brace, an optimal n value can be 16, whereas an input of a triangle chain can result in an optimal n value of 64.

Out-of-Class Measurements Probability Distribution: This term is used herein to refer to a probability distribution that includes data considered to not be representative of the given input/sample.

Out-of-Class Measurements: This term is used herein to refer to data that is not part of the measurements that are generated by comparing the outputted synthetic variants against the given input/sample.

Over-the-Air Points: This term is used herein to refer to segments of a movement that outlie a multistroke gesture and as such are discarded.

Rejection Threshold: This term is used herein to refer to the value at which similarity between previous samples (e.g., gestures) and a new/future sample (e.g., gesture) determines whether the new sample is representative of the previous samples (e.g., whether the user actually performed the gesture). Considering gestures, for example, if similarity is sufficiently high, then the gesture is considered performed and the sample is accepted; if similarity is not sufficiently high, then the gesture is considered not performed and the sample is rejected.

Statistical Features: This term is used herein to refer to data-driven characteristics of a given input or its underlying time series.

Synthetic In-Class Measurements Probability Distribution: This term is used herein to refer to a probability distribution that includes synthetic variants considered to be positively representative of the given input/sample.

Synthetic Stroke: This term is used herein to refer to a computer-generated set of data that is representative of a given input/sample, where the computer-generated data can be tranformed as needed depending on the resulting synthetic variant.

Synthetic Variant: This term is used herein to refer to a computer-generated variable or data that is a modification of a given input sample, such as a gesture.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

What is claimed is:

1. A method of generating a synthetic variant of a given input for an application, the method comprising the steps of:
    receiving to and recording on a computer-readable storage device an input time series of K points;
    stochastically resampling the time series of K points into a first set of n points along the series' path, whereby a path distance between the n points is non-uniform;
    extracting and normalizing a direction vector between each consecutive pair of points to a unit length, wherein the direction vector between the each consecutive pair of points is lengthened or shortened as a result of the resampling and normalization;
    concatenating a resulting plurality of normalized direction vectors to create a second set of n points, wherein the origin of the first vector in the series is at the center of a coordinate system, wherein the resulting series forms a shape that can be translated, scaled, skewed and rotated as necessary; and
    outputting the synthetic variant based on the formed shape, whereby perturbations are simulated directly on the given input itself,
    wherein the method is repeated to generate a plurality of synthetic variants and wherein the application is a gesture recognizer, the method further comprising:
    generating a synthetic samples distribution based on the plurality of synthetic variants; and
    training the gesture recognizer with the synthetic samples distribution.

2. The method of claim 1, further comprising the step of extracting a predetermined set of statistical features from the input time series of K points prior to resampling, wherein a cardinality of the first set of n points is established based on statistical features of the input time series of K points.

3. The method of claim 2, wherein the predetermined set of statistical features of the input time series relate to density and closedness of the K points within the input time series.

4. The method of claim 3, wherein a cardinality of the first set of n points is an optimal n value based on the following equation:

$$n = \exp\{1.67 + 0.29 \text{ density} + 1.42 \text{ closedness}\}.$$

5. The method of claim 4, wherein the optimal n value is from about 16 sampling points to about 69 sampling points.

6. The method of claim 1, further comprising randomly selecting a subset of n points from the first set of n points along the path defined by the time series, wherein the step of random selection occurs prior to extracting and normalizing the direction vector.

7. The method of claim 6, further comprising removing the randomly selected subset of n points from the first set of n points, wherein the remaining unremoved n points from the first set of n points undergo the step of extraction and normalization.

8. The method of claim 1, wherein the step of extracting and normalizing the direction vector between the each consecutive pair of points and concatenating the plurality of normalized direction vectors is performed by generating a synthetic stroke that can be scaled, translated, rotated, and smoothed as necessary.

9. The method of claim 1, further comprising smoothing the synthetic variant.

10. The method of claim 1, wherein the given input is a multistroke gesture including a plurality of strokes, the method further comprising:
    randomly permuting the plurality of strokes and reversing a random subset of the plurality of strokes;
    combining the plurality of strokes together into the time series of K points prior to resampling; and
    discarding over-the-air points, resulting in the synthetic variant being a synthetic multistroke gesture that is generated, wherein the step of discarding the over-the-air points occurs after the normalization and concatenation steps.

11. The method of claim 1, wherein the method is repeated to generate a plurality of synthetic variants, the method further comprising:

measuring the plurality of synthetic variants against the given input;

generating a synthetic in-class measurements probability distribution from the measurements, wherein the synthetic in-class measurements probability distribution is based on input samples;

generating an out-of-class measurements probability distribution from out-of-class measurements, wherein the out-of-class measurements probability distribution is based on synthetic non-input samples;

establishing a rejection threshold based on the synthetic in-class measurements probability distribution and the out-of-class measurements probability distribution, wherein the rejection threshold minimizes the probability of false negative errors and false positive errors.

12. The method of claim 11, wherein the step of establishing the rejection threshold is performed by:

selecting an objective function to be maximized;

estimating a value of the objective function using the synthetic in-class measurements probability distribution and the out-of-class measurements probability distribution, wherein the estimate is made at each point along a range of measurement values of the combined synthetic in-class and out-of-class measurements probability distributions;

determining a measurement value that maximizes the objective function based on the estimated value of the objective function, wherein the determined measurement value is the rejection threshold.

13. The method of claim 11, wherein the step of measuring the plurality of synthetic variants against the given input is performed via 1-nearest neighbor classification.

14. The method of claim 11, wherein the synthetic in-class input samples are generated by stochastically resampling the time series of K points and normalizing the direction vector between each consecutive pair of points.

15. The method of claim 1, wherein the method is repeated to generate a plurality of synthetic variants and wherein the application is image generation, the method further comprising stochastically resampling each stroke to generate a sketched image.

16. The method of claim 1, wherein:
the given input is an input image,
edges are extracted from the input image,
the application is image variant generation,
wherein the edges within the input image are stochastically resampled to generate a synthetic, non-photorealistic variant of the input image.

17. One or more tangible non-transitory computer-readable media having computer-executable instructions for performing a method of running a software program on a computing device, the computing device operating under an operating system, the method including issuing instructions from the software program to generate a synthetic variant of a given input for an application, the instructions comprising:

receiving to and recording on a computer-readable storage device an input time series of K points;

stochastically resampling the time series of K points into a first set of n points along the series' path, whereby a path distance between the n points is non-uniform;

extracting and normalizing a direction vector between each consecutive pair of points to a unit length, wherein the direction vector between the each consecutive pair of points is lengthened or shortened as a result of the resampling and normalization;

concatenating a plurality of normalized direction vectors to create a second set of n points, wherein the origin of the first vector in the series is at the center of a coordinate system, wherein the resulting series forms a shape that can be translated, scaled, skewed and rotated as necessary; and outputting the synthetic variant based on the formed shape, whereby perturbations are simulated directly on the given input itself, wherein the method is repeated to generate a plurality of synthetic variants and wherein the application is a gesture recognizer, wherein the instructions further comprise:

generating a synthetic samples distribution based on the plurality of synthetic variants; and training the gesture recognizer with the synthetic samples distribution.

18. The one or more tangible non-transitory computer-readable media of claim 17, wherein the instructions further comprise the step of extracting a predetermined set of statistical features from the input time series of K points prior to resampling, wherein a cardinality of the first set of n points is established based on statistical features of the input time series of K points.

19. The one or more tangible non-transitory computer-readable media of claim 18, wherein the predetermined set of features of the input time series relate to density and closedness of the K points within the input time series.

20. The one or more tangible non-transitory computer-readable media of claim 19, wherein a cardinality of the first set of n points is an optimal n value based on the following equation:

$$n=\exp\{1.67+0.29 \text{ density}+1.42 \text{ closedness}\}.$$

21. The one or more tangible non-transitory computer-readable media of claim 20, wherein the optimal n value is from about 16 sampling points to about 69 sampling points.

22. The one or more tangible non-transitory computer-readable media of claim 17, wherein the instructions further comprise randomly selecting a subset of n points from the first set of n points along a trajectory defined by the time series, wherein the step of random selection occurs prior to extracting and normalizing the direction vector.

23. The one or more tangible non-transitory computer-readable media of claim 22, wherein the instructions further comprise removing the randomly selected subset of n points from the first set of n points, wherein the remaining unremoved n points from the first set of n points undergo the step of extraction and normalization.

24. The one or more tangible non-transitory computer-readable media of claim 17, wherein the step of extracting and normalizing the direction vector between the each consecutive pair of points and concatenating the plurality of normalized direction vectors is performed by generating a synthetic stroke that can be scaled, translated, rotated, and smoothed as necessary.

25. The one or more tangible non-transitory computer-readable media of claim 17, wherein the instructions further comprise smoothing the synthetic variant.

26. The one or more tangible non-transitory computer-readable media of claim 17, wherein the given input is a multistroke gesture including a plurality of strokes, wherein the instructions further comprise:

randomly permuting the plurality of strokes and reversing a random subset of the plurality of strokes;

combining the plurality of strokes together into the time series of K points prior to resampling; and discarding over-the-air points, resulting in the synthetic variant being a synthetic multistroke gesture that is generated, wherein the step of discarding the over-the-air points occurs after the normalization and concatenation steps.

27. The one or more tangible non-transitory computer-readable media of claim 17, wherein the method is repeated to generate a plurality of synthetic variants, wherein the instructions further comprise:
measuring the plurality of synthetic variants against the given input;
generating a synthetic in-class measurements probability distribution from the measurements, wherein the synthetic in-class measurements probability distribution is based on input samples;
generating an out-of-class measurements probability distribution from out-of-class measurements, wherein the out-of-class measurements probability distribution is based on synthetic non-input samples;
establishing a rejection threshold based on the synthetic in-class measurements probability distribution and the out-of-class measurements probability distribution, wherein the rejection threshold minimizes the probability of false negative errors and false positive errors.

28. The one or more tangible non-transitory computer-readable media of claim 27, wherein the step of establishing the rejection threshold is performed by:
selecting an objective function to be maximized;
estimating a value of the objective function using the synthetic in-class measurements probability distribution and the out-of-class measurements probability distribution, wherein the estimate is made at each point along a range of measurement values of the combined synthetic in-class and out-of-class measurements probability distributions;
determining a measurement value that maximizes the objective function based on the estimated value of the objective function, wherein the determined measurement value is the rejection threshold.

29. The one or more tangible non-transitory computer-readable media of claim 27, wherein the step of measuring the plurality of synthetic variants against the given input is performed via 1-nearest neighbor classification.

30. The one or more tangible non-transitory computer-readable media of claim 27, wherein the synthetic in-class samples are generated by stochastically resampling the time series of K points and normalizing the direction vector between each consecutive pair of points.

31. The one or more tangible non-transitory computer-readable media of claim 17, wherein the method is repeated to generate a plurality of synthetic variants and wherein the application is image generation, wherein the instructions further comprise stochastically resampling each stroke to generate a sketched image.

32. The one or more tangible non-transitory computer-readable media of claim 17, wherein:
the given input is an input image,
edges are extracted from the input image,
the application is image variant generation,
wherein the edges within the input image are stochastically resampled to generate a synthetic, non-photorealistic variant of the input image.

33. A method of training a gesture recognizer by generating a plurality of synthetic variants of a given input gesture, comprising the steps of:
receiving to and recording on a computer-readable storage device an input time series of K points;
extracting a predetermined set of statistical features from the input time series of K points, wherein the predetermined set of features of the input time series include density and closeness of the K points within the input time series;
stochastically resampling the time series of K points into a first set of n points along the series' path, whereby a path distance between the n points is non-uniform, wherein a cardinality of the first set of n points is established based on statistical features of the input time series of K points;
randomly selecting a subset of n points from the first set of n points along a trajectory defined by the time series;
removing the randomly selected subset of n points from the first set of n points;
extracting and normalizing a direction vector between each consecutive pair of remaining unremoved n points to a unit length, wherein the direction vector between the each consecutive pair of points is lengthened or shortened as a result of the resampling and normalization;
concatenating a plurality of normalized direction vectors to create a second set of n points, wherein the origin of the first vector in the series is at the center of a coordinate system, wherein the resulting series forms a shape that can be translated, scaled, skewed and rotated as necessary;
outputting a synthetic variant based on the formed shape, whereby perturbations are simulated directly on the given input itself;
repeating the foregoing steps to generate the plurality of synthetic variants;
generating a synthetic samples distribution based on the plurality of synthetic variants;
measuring the plurality of synthetic variants against the given input;
generating a synthetic in-class measurements probability distribution from the measurements, wherein the synthetic in-class measurements probability distribution is based on input samples;
generating an out-of-class measurements probability distribution from out-of-class measurements, wherein the out-of-class measurements probability distribution is based on synthetic non-input samples;
establishing a rejection threshold based on the synthetic in-class measurements probability distribution and the out-of-class measurements probability distribution, wherein the rejection threshold minimizes the probability of false negative errors and false positive errors,
wherein the step of establishing the rejection threshold is performed by:
selecting an objective function to be maximized,
estimating a value of the objective function using the synthetic in-class measurements probability distribution and the out-of-class measurements probability distribution, wherein the estimate is made at each point along a range of measurement values of the combined synthetic in-class and out-of-class measurements probability distributions, and
determining a measurement value that maximizes the objective function based on the estimated value of the objective function, wherein the determined measurement value is the rejection threshold; and
training the gesture recognizer with the synthetic samples distribution including the rejection threshold.

* * * * *